(12) United States Patent
Rowen et al.

(10) Patent No.: US 10,451,448 B2
(45) Date of Patent: Oct. 22, 2019

(54) TAILOR DISTRIBUTED AMPLIFICATION FOR FIBER SENSING

(71) Applicant: PRISMA PHOTONICS LTD., Tel Aviv (IL)

(72) Inventors: Eitan Rowen, Modiin (IL); Eran Inbar, Tel Aviv (IL)

(73) Assignee: PRISMA PHOTONICS LTD., Tel Aviv (IL)

( * ) Notice: Subject to any disclaimer, the term of this patent is extended or adjusted under 35 U.S.C. 154(b) by 0 days.

(21) Appl. No.: 16/146,848

(22) Filed: Sep. 28, 2018

(65) Prior Publication Data

US 2019/0101419 A1 Apr. 4, 2019

(30) Foreign Application Priority Data

Sep. 29, 2017 (IL) .......................................... 254803

(51) Int. Cl.
*G01D 5/353* (2006.01)
*H01S 3/30* (2006.01)
(Continued)

(52) U.S. Cl.
CPC ..... *G01D 5/35364* (2013.01); *G01D 5/35316* (2013.01); *H01S 3/0675* (2013.01);
(Continued)

(58) Field of Classification Search
CPC ........... G01D 5/35364; G01D 5/35358; G01D 5/35354; G01D 5/35338; G01D 5/35316;
(Continued)

(56) References Cited

U.S. PATENT DOCUMENTS 4,616,898 A * 10/1986 Hicks, Jr. ............. G02B 6/2821
359/327
6,163,636 A 12/2000 Stentz et al.
(Continued)

FOREIGN PATENT DOCUMENTS

CA 2766901 A1 11/2010

OTHER PUBLICATIONS

International Search Report dated Jan. 22, 2019 for International Application No. PCT/IL2018/051070, 3 pages.
(Continued)

*Primary Examiner* — John R Lee
(74) *Attorney, Agent, or Firm* — Knobbe, Martens, Olson & Bear, LLP

(57) ABSTRACT

A method of providing in-line Raman amplification in an optical fiber sensing system, including the procedures of generating a probe light having a probe wavelength, transmitting the probe light into an optical fiber, generating at least one Raman pump light at a respective pump wavelength, the pump wavelength being shorter than the probe wavelength, generating at least one Raman seed light at a respective seed wavelength, the seed wavelength being between the pump and probe wavelengths, transmitting the Raman pump light into the optical fiber, transmitting the Raman seed light into the optical fiber and propagating the Raman pump light, the Raman seed light and the probe light along the optical fiber to achieve distributed Raman amplification of signal light produced by the probe light as it propagates along the optical fiber.

33 Claims, 9 Drawing Sheets

(51) Int. Cl.
*H01S 3/067* (2006.01)
*H01S 3/094* (2006.01)
*H01S 3/108* (2006.01)

(52) U.S. Cl.
CPC .... *H01S 3/06787* (2013.01); *H01S 3/094011* (2013.01); *H01S 3/1086* (2013.01); *H01S 3/302* (2013.01)

(58) Field of Classification Search
CPC ........... G01D 5/35309; G01D 5/35306; G01D 5/35303; G01D 5/353; G01D 5/34; G01D 5/32; G01D 5/26; H01S 3/0675; H01S 3/067; H01S 3/06787; H01S 3/094011; H01S 3/1086; H01S 3/108; H01S 3/302; H01S 3/30
See application file for complete search history.

(56) References Cited

U.S. PATENT DOCUMENTS

| | | | | |
|---|---|---|---|---|
| 6,519,026 | B1* | 2/2003 | Holland | G01M 11/3109 |
| | | | | 356/73.1 |
| 6,700,696 | B2 | 3/2004 | Dominic et al. | |
| 6,850,360 | B1 | 2/2005 | Chen et al. | |
| 8,836,927 | B2 | 9/2014 | López et al. | |
| 8,989,526 | B2 | 3/2015 | Hartog | |
| 2002/0118442 | A1* | 8/2002 | Ghera | H04B 10/2916 |
| | | | | 359/334 |
| 2003/0081920 | A1* | 5/2003 | Kamiya | G02B 6/02028 |
| | | | | 385/124 |
| 2003/0169480 | A1* | 9/2003 | Inoue | H01S 3/302 |
| | | | | 359/334 |
| 2004/0028358 | A1* | 2/2004 | Cremer | H04B 10/2916 |
| | | | | 385/123 |
| 2010/0157416 | A1* | 6/2010 | Sugaya | G02B 6/264 |
| | | | | 359/334 |
| 2011/0013267 | A1* | 1/2011 | Griseri | H01S 3/302 |
| | | | | 359/334 |
| 2011/0026104 | A1* | 2/2011 | Hiraizumi | H01S 3/06754 |
| | | | | 359/334 |
| 2011/0080634 | A1* | 4/2011 | Bragheri | H01S 3/06758 |
| | | | | 359/334 |
| 2011/0210252 | A1* | 9/2011 | Ouchi | G01N 21/4795 |
| | | | | 250/338.1 |
| 2012/0062875 | A1 | 3/2012 | López et al. | |
| 2014/0348501 | A1* | 11/2014 | Bao | H04B 10/0797 |
| | | | | 398/29 |
| 2015/0364897 | A1* | 12/2015 | Wisk | H01S 3/302 |
| | | | | 359/334 |
| 2015/0377656 | A1* | 12/2015 | Bastianini | G01D 5/35364 |
| | | | | 356/301 |
| 2016/0010971 | A1* | 1/2016 | Islam | H01S 5/0064 |
| | | | | 250/353 |
| 2016/0344158 | A1* | 11/2016 | Onose | H01S 3/30 |
| 2017/0108358 | A1* | 4/2017 | Bastianini | G01D 5/35303 |
| 2017/0115138 | A1* | 4/2017 | Sternklar | G01M 11/3109 |
| 2017/0153178 | A1* | 6/2017 | Gruner-Nielsen | G01N 21/636 |
| 2017/0155225 | A1* | 6/2017 | Villeneuve | G01S 17/00 |
| 2017/0176221 | A1* | 6/2017 | Hartog | G01D 5/35364 |
| 2018/0024241 | A1* | 1/2018 | Eichenholz | G01S 17/00 |
| | | | | 356/5.01 |
| 2018/0136138 | A1* | 5/2018 | Zhao | G01N 21/658 |
| 2018/0364356 | A1* | 12/2018 | Eichenholz | G01S 17/105 |
| 2019/0101419 | A1* | 4/2019 | Rowen | G01D 5/35316 |

OTHER PUBLICATIONS

Written Opinion of the International Searching Authority dated Jan. 22, 2019 for International Application No. PCT/IL2018/051070, 4 pages.

Hugo Martins et al, "300 km-ultralong Raman fiber lasers using a distributed mirror for sensing applications", Optics Express, vol. 19, No. 19, Sep. 12, 2011, pp. 18149-18154.

JoséLuís Santos et al, "Handbook of Optical Sensors", CRC Press.

Sonia Martin-Lopez et al., "Brillouin optical time-domain analysis assisted by second-order Raman amplification", Optics Express, Aug. 30, 2010, vol. 18, No. 18, pp. 18769-18778.

Hugo F. Martins et al., "Distributed vibration sensing over 125km with enhanced SNR using phi-OTDR over an URFL cavity", Journal of Lightwave Technology, DOI 10.1109/JLT.2015. 2396359, IEEE 2015, 0733-8724.

J.-C. Bouteiller et al., "Dual-Order Raman Pump", IEEE Photonics Technology Letters, vol. 15, No. 2, Feb. 2003, pp. 212-214.

J.-C. Bouteiller et al., "Dual-order Raman pump providing improved noise figure and large gain bandwidth", Optical Fiber Communication Conference and Exhibit, IEEE 2002.

K.T.V. Grattan et al., "Fiber optic sensor technology: an overview", Sensors and Actuators 82, 2000. pp. 40-61.

Hugo F. Martins et al., "Phase-sensitive Optical Time Domain Reflectometer Assisted by First-order Raman Amplification for Distributed Vibration Sensing Over >100 km", Journal of Lightwave Technology, vol. 32, No. 8, Apr. 15, 2014, pp. 1510-1518.

Alejandro Dominguez-Lopez et al., "Strong Cancellation of RIN Transfer in a Raman-Assisted BOTDA Using Balanced Detection", IEEE Photonics Technology Letters, vol. 26, No. 18, Sep. 15, 2014, pp. 1817-1820.

Macheng Lai et al., "Ultra-long Distance Distributed Intrusion Detecting System Assisted With In-line Amplification", IEEE Photonics Journal, vol. 9, No. 2, Apr. 2017.

Z. N. Wang et al., "Ultra-long phase-sensitive OTDR with hybrid distributed amplification", Optics Letters / vol. 39, No. 20 / Oct. 15, 2014, pp. 5866-5869.

\* cited by examiner

TAILOR DISTRIBUTED AMPLIFICATION FOR FIBER SENSING

CROSS-REFERENCE TO RELATED APPLICATIONS

This application claims priority to Israeli patent application no. 254803 filed on Sep. 29, 2017, the entire disclosure of which is hereby incorporated by reference.

TECHNICAL FIELD

The disclosure relates to long range fiber optic sensing systems, in general, and to methods and systems for improving the range of fiber optic sensing systems without external amplification, in particular.

BACKGROUND

Many fields of industry are now using fiber optic sensors (herein abbreviated FOS) for applications that require sensing over long ranges. This includes distributed acoustic sensing systems, temperature sensing systems, leak detection systems, systems for monitoring the structural stability of bridges, buildings, railroads and the like. Long range fiber optic sensing applications can include pipeline sensing systems for determining the precise location of leaks in pipelines carrying liquids and gases such as gasoline and water, as well as border detection systems for detecting intrusions over a border.

Fiber optic sensing systems utilize fiber optic cables (also known as and referred to as optical fibers or sensing fibers) to carry information over long distances from sensors placed along the fiber optic cables. The sensors may be point sensors, fiber Bragg gratings (herein abbreviated FBG) and the like. The information carried is essentially light and characteristics related to light which is provided to a processor for processing the information. Differences in the characteristics of the light reaching the processor, such as FBG reflection amplitudes or resonance shifts, can be used to measure temperature or strain, for example. In other fiber optic sensing systems, instead of sensing light from discrete sensors, information is carried by the scattering intensity, resonances or interference patterns of light scattered from the entire length of an optical fiber. In this sense, the fiber optic sensing system is a distributed sensing system. In this type of sensing system, the entire optical fiber can serve as a continuous array of sensors or a distributed fiber optic sensor (herein abbreviated DFOS). In DFOS systems, different known physical scattering phenomena such as Rayleigh scattering, Raman scattering and Brillouin scattering can be utilized to produce signal light which can be measured for sensing purposes. For example, a map of disturbances or phase changes in the Rayleigh back-scattering pattern along the sensing fiber can be generated and utilized to detect a gas leak in a pipe, an intruder, the presence of fire in a tunnel, and the like. Alternatively, a physical parameter (such as temperature, strain, pressure and the like) can be determined by changes in one of the above mentioned scattering phenomena along the sensing fiber. A map of the temperature along the sensing fiber can be generated by measuring the shift in the Brillouin scattering resonance of either forward-scattered or back-scattered light, or by measuring the relative amplitudes of Raman scattering along the sensing fiber. In DFOS systems, the received signal must be correlated to the location of the scattering event in the sensing fiber thus enabling the determination of the location along the sensing fiber. This can be done by using probe pulses and analyzing the scattered signal in the time domain. In the case of back-scattered signals this method is known as optical time domain reflectometry (herein abbreviated as OTDR). In cases where the forward-scattered signal is analyzed, the method is known as optical time domain analysis (herein abbreviated as OTDA). An alternative way of correlating the signal to the location in the sensing fiber is by sweeping the laser signal and analyzing the measured signal in the frequency domain, as is done for example in a method referred to as optical frequency domain reflectometry (herein abbreviated as OFDR).

Fiber optic sensing systems in which the forward-scattered signal is analyzed such as OTDA must allow access to the sensing fiber at both ends, either enabling a loop geometry or having two distinct control centers at both fiber ends, each requiring electricity and communication between them. An example of such a sensing system is a Brillouin OTDA system (herein abbreviated BOTDA). Fiber optic sensing systems in which back-scattered signals are measured can be designed so that the system requires access to only one end of the sensing fiber, wherein the probe pulse or light beam is both transmitted and received from a first control center. These kinds of systems are useful in scenarios where the second end of the optical fiber is either inaccessible or difficult to access. Examples of such scenarios include pipelines, deep drilling systems, borders and roads wherein it is either impossible, problematic or expensive to lay the necessary infrastructure (such as electricity and communication systems) at the second end of an optical fiber. It is noted as well in that such configurations, the distance between control centers that require electricity and communication systems can be twice the sensing fiber length provided that access to both ends of the optical fiber is not required.

The practical length of the sensing fiber is limited by weak back-scattered and/or forward-scattered signals as well as by attenuation of the probe light or pulse and attenuation of the scattered signals. The signal-to-noise ratio (herein abbreviated SNR) of the sensed scattered signal must be high enough to differentiate the sensed signal from noise in the signal. For weak enough signals, shot-noise is the dominant source of noise, causing the SNR to decrease with the measured power. Typical fiber optic sensing systems can provide signals up to 20-50 kilometers before the attenuation is significant enough to make signal detection difficult. One solution for increasing the length of detection of such a fiber optic sensing system would be to place an optical amplifier every 40-50 kilometers such that the signal can travel distances of hundreds of kilometers if necessary. However, such a solution has limitations. It requires access to the sensing fiber, which may be buried underground for example in the case of a buried pipeline or a border breach detection system. Moreover, it requires the infrastructure of electricity and communications at every amplification site. In addition, these sites might need protection against tampering and/or sabotage thus increasing the maintenance costs of such a system. The cost of the setup and maintenance of such an array of amplifiers render this solution impractical for many scenarios.

Another solution to increasing the reach of an FOS system would be to simply send an initial probe pulse or light beam with higher power. However non-linear effects and phenomena such as stimulated Raman scattering (herein abbreviated SRS), stimulated Brillouin scattering (herein abbreviated SBS) and modulation instability (herein abbreviated MI), limit the power of the probe pulse or light signal to a range of single milliwatts to hundreds of milliwatts depending on the application and configuration of the FOS system. Powers above that range will result in non-linear effects in the sensing fiber, thereby preventing accurate detection of any scattered signals. The power range above which non-linear effects and phenomena begin to occur is referred to herein as the non-linear threshold.

Reference is now made to FIG. 1, which is a schematic illustration of a fiber optic sensing system with no additional amplification, generally referenced 10, as is known in the art. Fiber optic sensing system 10 is a phase OTDR system using direct detection of back-scattered light from a sensing fiber wherein the end of the fiber is inaccessible to electronics or optical pumping. Fiber optic sensing system 10 includes an interrogation unit 26 which is coupled to a sensing optical fiber 22 (also referred to as a sensing fiber, an optical fiber or simply a fiber). Interrogation unit 26 includes a narrow linewidth probe laser 12, a modulator 14, a circulator 16, a detector 18 and a processor 20. Modulator 14 is coupled with probe laser 12 and circulator 16. Detector 18 is coupled with processor 20 and is optically coupled with circulator 16 to receive and detect light coming from circulator 16. Optical fiber 22 is coupled with circulator 16 and has an end point 24. For the purposes of simplicity, any amplification stages which might be used in fiber optic sensing system 10 either for amplifying probe light generated anywhere between probe laser 12 and sensing optical fiber 22 or for amplifying back-scattered light anywhere between sensing optical fiber 22 and detector 18 are omitted.

Probe laser 12 provides probe light which is modulated by modulator 14 to create a probe pulse. The probe pulse is sent to circulator 16 which sends the probe pulse along the length of optical fiber 22. As the probe pulse travels down optical fiber 22, it is partially back-scattered towards circulator 16. The back-scattered light is separated from the probe pulse by circulator 16 which can be an optical circulator or optical splitter.

The back-scattered light is provided by circulator 16 to detector 18, which detects the characteristics of the light and provides the detected characteristics to processor 20. The processor compares the interference patterns generated by different pulses and correlates the time of the received signal to the location of its reflection along sensing fiber 22. Provided the SNR of the probe pulse is high enough, processor 20 can determine at what distance from interrogation unit 26 a significant enough change occurred in the phase of the probe pulse which might indicate a leak, an intruder and the like.

Characteristics about the back-scattered light are captured by detector 18 and are provided to processor 20 for extracting information about the back-scattered light. Examples of such characteristics can include frequency, phase, intensity, interference and the like. In FIG. 1 the spatial resolution is determined by the pulse width generated by modulator 14. The spatial resolution refers to the resolution in distance wherein a change in a measurand such as temperature or strain can be determined and practically refers to the length of fiber in which a leak or an intruder can be located. To ensure that there is no overlap between the back-scatterings of consecutive probe pulses, the pulse repetition rate (herein abbreviated PRR) of the probe laser must be lower than the inverse of the roundtrip time it takes the probe pulse to propagate along optical fiber 22 to end point 24 and back to circulator 16. As mentioned above, the peak power of the probe pulse must be limited to avoid non-linear phenomena occurring along optical fiber 22.

A practical use of fiber optic sensing system 10 is the detection of an intruder over a border protection system using Rayleigh scattering. In order to avoid non-linear phenomena in optical fiber 22, it is assumed that the peak power entering sensing fiber 22 is limited to 5 milliwatts (herein abbreviated mW). The probe pulse provided by probe laser 12 propagates down optical fiber 22 and any light which is back-scattered along optical fiber 22 due to Rayleigh scattering is received by circulator 16 and provided to detector 18. The intensity of the back-scattered light has a speckle-like pattern resulting from interference between different scattering events that occur within the probe pulse at different locations along optical fiber 22, reaching detector 18 simultaneously. Any local change in the index of refraction will change the phases between back-scattered constituents of the signal and will result in a change in the speckle-like pattern of consecutive probe pulses. Such a change in the back-scattered probe light measurement is indicative of an intruder and since the roundtrip time of the probe light which caused the change is known, the location of the breach of the intruder along the border can be determined.

Reference is now made to FIG. 2, which is a graph of a simulation using the fiber optic sensing system of FIG. 1, showing the absolute value of the difference between two consecutive probe light measurements on a logarithmic scale, generally referenced 30, as is known in the art. Graph 30 includes an X-axis 32, showing distance in kilometers (herein abbreviated km) along a sensing fiber (such as optical fiber 22 in FIG. 1) and a Y-axis 34, showing the power in decibels referenced to one milliwatt (herein abbreviated dBm). The simulation as shown has been designed to exhibit disturbances between measurements along the optical fiber at the following distances: 15 km, 40 km, 65 km, 90 km and 115 km. In a sensing system as in FIG. 1, shot-noise is a dominant source of noise and is shown in graph 30 via an arrow 40. As can be seen by an arrow 36, there is a natural quasi-linear attenuation of about 0.2 decibels (herein abbreviated dB) per kilometer in the noise level. This is a result of an attenuation of about 0.4 dB/km in the back-scattered signal (0.2 dB/km in each direction of the roundtrip) and the square root dependence of shot noise power on the signal power. A first disturbance is shown at 15 km via an arrow 38 whereas a second disturbance is shown at 40 km via an arrow 42. In the simulation, the pulse width was set to 100 nanoseconds (herein abbreviated ns) which corresponds to a spatial resolution of about 10 meters. For the selected parameters, as shown, the first disturbance at 15 km (arrow 38) is easily detected by a processor however the second disturbance at 40 km (arrow 42) is nearly impossible to detect given the attenuation along the optical fiber. By 40 km, the shot noise is as strong at the disturbance, which is not resolvable unless some form of in-line amplification is used to boost the disturbance signal over the noise signal. The disturbances at 65 km, 90 km and 115 km are drowned out by noise. Thus the sensing system as shown in FIG. 1 may be good for applications in which a reach of up to 40 km is desired however for distances larger than that, the sensing system of FIG. 1 is inadequate. Such sensing systems are known in the prior art and are described, for example, in Grattan, K. T. V. and Sun. T., "Fiber optic sensor technology: an overview," *Sensors and Actuators A Physical*, volume 82, numbers 1-3, May 2000, pp. 40-61 and in Santos, J. L. and Farahi, F., *Handbook of Optical Sensors*, CRC Press, Boca Raton, 2015.

As shown and explained above in FIGS. 1 and 2, the power of the captured back-scattered light pulse or signal by the detector is typically a small fraction of the power of the probe pulse, which itself is limited. In the case of fiber optic sensing systems using fiber Bragg gratings (herein abbreviated FBGs), the power of the captured back-scattered signal may be than less 10% of the power of the probe pulse, whereas in DFOS systems, the power of the captured back-scattered signal may be less than $10^{-3}$% of the power of the probe pulse. Add to this the natural attenuation of both the probe pulse and the back-scattered light pulse thereby makes the application of DFOS systems over tens of kilometers in length non-trivial. As shown in FIG. 2, a low SNR of the back-scattered light pulse can limit the spatial resolution of a sensing system, leading to high false alarm rates, incorrect classification or missed events in an intrusion detection system and also resulting in low accuracy of the measurand, such as strain, temperature, flow and/or pressure in other sensing applications.

As mentioned above, one way of extending the reach of a fiber optic sensing system, for example to extend the reach of the system of FIG. 1 as simulated in FIG. 2, is to place amplifiers along the optical fiber for overcoming attenuation within the fiber. Such an approach is known in the art and is described in Lai, M. et al., "Ultra-long Distance Distributed Intrusion Detecting System Assisted With In-line Amplification," *IEEE Photonics Journal*, volume 9, number 2, April 2017, pp. 1-10. Whereas this approach may increase the reach of a fiber optic sensing system, it requires bringing electricity and communications to multiple control centers or control points along the optical fiber. This may involve bringing pump light to additional amplifiers positioned along the optical fiber and also adding maintenance points, thus losing some of the advantages of long distance FOS.

One approach to increasing the reach of a fiber optic sensing system without the use of external amplifiers is to use in-line Raman amplification of the probe pulse, the back-scattered signal or both. Reference is now made to FIG. 3, which is a schematic illustration of a fiber optic sensing system using in-line Raman amplification, generally referenced 50, as is known in the art. Fiber optic sensing system 50 includes an interrogation unit 70, which is coupled to a sensing optical fiber 68. Interrogation unit 70 includes a narrow linewidth probe laser 52, a modulator 54, a circulator 56, a detector 58, a processor 60, a wavelength division multiplexer (herein abbreviated WDM) filter 62 and a Raman pump laser 64. Modulator 54 is coupled with probe laser 52 and circulator 56. Detector 58 is coupled with processor 60 and is optically coupled with circulator 56 to receive and detect light coming from circulator 56. WDM filter 62 couples light from the Raman pump laser 64 to the sensing fiber 68. Optical fiber 68 is coupled with circulator 56 through WDM filter 62 and has an end point 66. For the purposes of simplicity, any amplification stages which might be used in fiber optic sensing system 50 either for amplifying a probe light anywhere between probe laser 52 and sensing optical fiber 68 or for amplifying back-scattered light between sensing optical fiber 68 and detector 58 are omitted.

The sensing system shown in FIG. 3 operates in a manner similar to the sensing system shown in FIG. 1 however it differs in that fiber optic sensing system 50 employs first order Raman amplification. Raman pump laser 64 produces pump light which is combined with the probe pulse produced by modulator 54 (from light generated by probe laser 52). The pump light is combined with optical fiber 68 via WDM filter 62 and can provide in-line amplification both to the probe pulse travelling down optical fiber 68 and the back-scattered light generated in sensing fiber 68 and propagating towards circulator 56. In general, the wavelength of the pump light generated by Raman pump laser 64 is selected such that it is near the peak of the Raman scattering spectrum. Like the probe pulse, the pump light provided by Raman pump laser 64 is also attenuated as it propagates down optical fiber 68. The pump light attenuates and decays exponentially along the distance of optical fiber 68. Therefore the maximal Raman gain is at the end of optical fiber 68 nearest to interrogator unit 70. The power of Raman pump laser 64 must be limited to avoid unwanted non-linear phenomena such as spontaneous Raman scattering occurring along optical fiber 68 which can mask any back-scattered signals and deteriorate the signal SNR. The Raman laser pump power is thus kept below a threshold for spontaneous Raman scattering at all locations along optical fiber 68. Attenuation of the pump light as it propagates along optical fiber 68 limits the in-line amplification of the probe pulse to a distance which is proportional to the attenuation length of the wavelength of Raman pump laser 64. This is typically around 10 km.

As mentioned above, the light generated by Raman pump laser 64 amplifies both the back-scattered light and the probe pulse itself. In order to keep the probe pulse power below the threshold for non-linear phenomena to be exhibited, either the Raman laser power that overlaps with the probe pulse must be limited to achieve very low amplification or the power of the probe pulse must be limited, which ultimately may reduce the SNR of the probe pulse. Therefore, when modulator 54 generates a probe pulse, the power of Raman pump laser 64 can be lowered or even set to zero.

In a variation of fiber optic sensor system 50, the pump light generated by the Raman pump laser can be coupled to the end of the sensing fiber and counter-propagated to the probe pulse generated by the probe laser (not shown in FIG. 3).

Reference is now made to FIG. 4, which is a graph of a simulation using the fiber optic sensing system of FIG. 3, showing the absolute value of the difference between two consecutive probe light measurements on a logarithmic scale, generally referenced 80, as is known in the art. Graph 80 includes an X-axis 82, showing distance in kilometers along an optical fiber (for example, sensing fiber 68 from FIG. 3), and a Y-axis 84, showing the power in dBm. The simulation as shown has been designed to exhibit disturbances between measurements along the optical fiber at the following distances: 15 km, 40 km, 65 km, 90 km and 115 km. Regarding the parameters of the sensor system of FIG. 3, the Raman pump laser is set to zero when the probe pulses are generated. At all other times, the power of the Raman laser is at 400 mW, which is just below the threshold for spontaneous Raman scattering. All other parameters as described above regarding FIG. 2 are the same. Shot-noise is shown via an arrow 90. The Raman pump light and the gain it supplies to the back-scattered light is exponentially attenuated as it propagates down the fiber. From relatively close locations, for example up to around 17 km, this gain is larger than the attenuation of the probe pulse and the back-scattered light, so the returned signal from this region is actually larger than locations further along the sensing fiber. Since both shot-noise 90 and the SNR grow with power, initially both shot-noise 90 and the back-scattered light SNR increase, shown as a section 86A. After around approximately 17 km, the amplification provided is less than the combined attenuation of the probe pulse and the back-scattered light. Thus after around 20 km, there is negligible in-line Raman amplification and the decay rate of the signal, shown as a section 86B, is similar to that of FIG. 2. Three separate arrows 88A, 88B and 88C respectively show the received power of the disturbances at 15 km, 40 km and 65 km respectively. As shown in the graph, the distance along the optical fiber which produces the strongest probe pulse signal is around 20 km. The disturbances at 15 km and 40 km are clearly visible and discernible, whereas the disturbance at 65 km, shown by arrow 88C, is comparable in power to the shot noise power. The disturbances at 90 km and 115 km however are masked by the shot noise and are not detectable using the sensor system of FIG. 3. The sensor system of FIG. 3 improves the reach of an FOS over the sensor system of FIG. 1, however the useable distances of such a sensor system are still limited.

Sensing systems as described in FIG. 3 are known in the art and are described in, for example, U.S. Pat. No. 8,989, 526, issued to Hartog, entitled "Raman Amplification in Distributed Optical Fiber Sensing Systems" and Martins, H. F. et al., "Phase-sensitive Optical Time Domain Reflectometer Assisted by First-order Raman Amplification for Distributed Vibration Sensing Over >100 km," *Journal of Lightwave Technology*, volume 32, number 8, April 2014, pp. 1510-1518.

The limitations of the sensor system of FIG. 3 can be partially overcome by using a sensor system employing second-order Raman amplification. Such a sensor system is shown in FIG. 5. Reference is now made to FIG. 5, which is a schematic illustration of a fiber optic sensing system using second order in-line Raman amplification, generally referenced 100, as is known in the art. Fiber optic sensing system 100 includes an interrogation unit 102 and an optical sensing fiber 126. Interrogation unit 102 includes a probe laser 106, a modulator 108, a circulator 110, a detector 112, a processor 114, a first WDM filter 116, a Raman laser 118, a first FBG 120A, a second FBG 120B and a second WDM filter 122. Interrogation unit 102 is coupled with optical fiber 126 at both ends, thereby forming an optical fiber loop 124. Second WDM 122 is coupled with Raman laser 118 and second FBG 120B couples second WDM 122 with optical fiber 126. Modulator 108 is coupled with probe laser 106 and circulator 110. Detector 112 is coupled with processor 114 and is optically coupled with circulator 110 to receive and detect signals coming from circulator 110. First WDM filter 116 is coupled with circulator 110, Raman laser 118 and first FBG 120A. Interrogation unit 102 substantially represents a respective control center which requires power in order to operate the probe laser and the Raman laser. Raman laser 118 can provide a forward propagating pump light via first WDM 116 and first FBG 120A, a counter-propagating pump light via second WDM 122 and second FBG 120B or both. For the purposes of simplicity, any amplification stages which might be used in fiber optic sensing system 100 for amplifying a probe light anywhere between probe laser 106 and optical fiber 126 or for amplifying back-scattered light between optical fiber 126 and detector 112 are omitted.

The sensor system shown in FIG. 5 is an example of a counter-propagating pump light, as Raman laser 118 can provide a counter-propagating Raman pump light via second WDM 122. The sensor system of FIG. 5 however requires that both ends of optical fiber 126 be accessible by interrogator unit 102, only enabling a loop geometry for sensing fiber 126 (i.e., optical fiber loop 124). The maximal reach along the sensing fiber for measurements is then only half the length of sensing fiber 126 due to the loop geometry. Such a sensor system thus cannot be used in scenarios where one fiber end is to be free and inaccessible and also halves the maximal distance between control points in long distance scenarios. In scenarios where sensing fiber 126 does form a loop, it is possible to use a system similar to fiber optic sensing system 50 (FIG. 3) with two free-ended sensing fibers (each going in an opposite direction), thereby forming a loop with a total length of twice the length of a single sensing fiber (as shown in FIG. 5). In order to compare the performance of the system of FIG. 5 with other prior art systems, a simulation of FIG. 5 as shown in FIG. 6 is presented below wherein the pump light from the Raman laser is only co-propagating, i.e., a system in which second WDM 122 is not present and aside from second FBG 120B, sensing fiber 126 has a free end.

The sensor system shown in FIG. 5 is also an example of a second order in-line Raman amplification setup which enables the amplification reach to be extended even further into the optical fiber as compared with the sensor system of FIG. 3. An example of this is described in Martin-Lopez, S. et al., "Brillouin optical time-domain analysis assisted by second-order Raman amplification," *Optics Express*, volume 18, number 18, August 2010, pp. 18769-18778. In the system of Martin-Lopez et al., FBGs and pump diode-lasers are positioned at both ends of an optical fiber as part of a fiber optic sensing system, thereby creating an ultra-long Raman fiber laser (herein abbreviated as URFL).

In the sensing system of FIG. 5, the Raman gain for the probe pulse and the back-scattered light is supplied by the mode of the URFL. Dynamics of the URFL require a number of roundtrips of this mode for it to build up and supply substantial Raman gain. In such a setup, it is impossible to significantly modulate the Raman gain according to a desired temporal gain profile as was the case of in fiber optic sensing system 50 (FIG. 3). Specifically, in the sensing system of FIG. 5, the Raman gain cannot be reduced during the time of the probe pulse. In order to prevent the probe pulse power from exceeding the non-linear threshold, it is necessary to reduce the probe pulse power that is coupled to optical fiber 126, so that after Raman amplification, the probe pulse power will reach the maximum allowed power (i.e., the non-linear threshold) only some distance along the sensing fiber.

Reference is now made to FIG. 6, which is a graph of a simulation using the fiber optic sensing system of FIG. 5, showing the absolute value of the difference between two consecutive probe light measurements on a logarithmic scale, generally referenced 140, as is known in the art. Graph 140 includes an X-axis 142, showing distance in kilometers along an optical fiber (such an optical fiber 126 in FIG. 5), and a Y-axis 144, showing the power in dBm. The simulation as shown has been designed to exhibit disturbances between measurements along the optical fiber at the following distances: 15 km, 40 km, 65 km, 90 km and 115 km. Regarding the parameters of the sensor system of FIG. 5, in order to remain within the threshold of preventing non-linear phenomena, the peak power of the probe pulse was reduced to 100 microwatts. The second order Raman forward pump power for the forward propagating pump light was set to 1.45 watts and in order to enable single ended operation (for comparison purposes as explained above), the Raman backward pump power for the counter-propagating pump light was set to zero. This set of parameters ensures that the probe pulse will not exceed the 5 mW power non-linear threshold and also maintains the URFL mode power under the 400 mW threshold for spontaneous Raman scattering.

An envelope 146 of the noise power is shown, showing an initial decrease over the first 10-15 km, shown by an arrow 150, and then a significant increase in power peaking around 40 km after which there is a slow attenuation over the next 100 km. Shot noise 152 present in the optical fiber is shown along with a plurality of arrows 148A, 148B, 148C and 148D showing disturbances at 40 km, 65 km, 90 km and 115 km respectively. However, the disturbance at 15 km is masked by the shot noise and is not detectable using the sensor system of FIG. 5.

It is noted that the low power of the probe pulse might introduce additional noise in the optical fiber which is not considered in the simulation of FIG. 6. The simulation of the system of FIG. 5 as shown in FIG. 6 does not consider both forward propagating and backward propagating Raman pump light, however nevertheless, the system of FIG. 5 requires access to both ends of the optical fiber for installing the two FBGs which could be a significant drawback and preventing installation of such a system on an existing buried optical fiber cable, for example. While using second order in-line Raman amplification does increase the gain further into the fiber, which now peaks around 40 km, the configuration still suffers from a lack of full temporal control over the amplification. The fact that the first order Raman mode power is determined by the FBGs makes it impossible to control the power of the Raman gain on a timescale shorter than a roundtrip time, which was the case of the simulation shown in FIG. 4. A result of this lack of control over the power of the Raman gain is the low input power of the probe pulse, as implied by arrow 150 that leads to the poor SNR shown at the beginning of the optical fiber before the probe pulse is amplified to 5 mW. As mentioned, this is very noticeable in the probe pulse at 15 km wherein the signal power is comparable to the shot noise limit, substantially making the disturbance at 15 km unnoticeable and not detectable.

Prior art use of second order Raman amplification is shown in FIG. 5. This sensor system differs from the sensor system of FIGS. 1 and 3 in a few ways. One is that the optical fiber is spliced to an FBG at each end. The FBGs form a cavity at a wavelength for which the probe pulse wavelength is near the Raman scattering spectral peak. The cavity is pumped at both ends to form a URFL. The wavelength of the pump diode laser is chosen such that the cavity wavelength is close to the Raman scattering peak. As mentioned above, this architecture has a few drawbacks. First, the optical fiber must be accessed at both ends. This eliminates the use of this sensing system in harsh environments where electronics cannot be used, either because of electromagnetic noise, heat, extreme cold or other reasons. In applications that require several control units such as long pipelines and borders which may be hundreds if not thousands of kilometers long, the sensor system of FIG. 5 halves the distance between control stations or control points where detectors are to be installed. Furthermore, in the sensor system of FIG. 5, the first order Raman mode cannot be controlled independently from the second order Raman mode, thus the gain profile is determined by design and cannot be altered in case of manufacturing variance. Moreover, the gain profile cannot be changed dynamically to adjust to environmental conditions, regions of interest or variations in the power of the probe pulses and the backscattered signals.

SUMMARY

It is an object of some embodiments to provide a novel method and system for high order in-line Raman amplification in an optical fiber sensing system to extend the amplification reach of the sensing system without the need to have access to both ends of the optical fiber and having dynamic control over the Raman gain.

In accordance with some embodiments, there is thus provided a method of providing in-line Raman amplification in an optical fiber sensing system. The method includes the procedures of generating a probe light having a probe wavelength, transmitting the probe light into an optical fiber and generating at least one Raman pump light at a respective pump wavelength and pump power. The respective pump wavelength is shorter than the probe wavelength, such that a corresponding frequency difference between the respective pump wavelength and the probe wavelength is a multiple of a frequency shift for which a Raman scattering coefficient is at least 25% of a resonant Raman scattering coefficient. The method further comprises the procedures of generating at least one Raman seed light at a respective seed wavelength and seed power, the respective seed wavelength being between the respective pump wavelength and the probe wavelength, transmitting the Raman pump light into the optical fiber and transmitting the Raman seed light into the optical fiber. The method also comprises the procedure of propagating the Raman pump light, the Raman seed light and the probe light along the optical fiber to achieve distributed Raman amplification of signal light produced by the probe light as it propagates along the optical fiber.

In accordance with another aspect of some embodiments, there is thus provided a fiber optic sensing system exploiting in-line high order Raman amplification. The sensing system includes a probe source, an optical fiber, a separator, a detector, a processor, at least one Raman seed laser, at least one Raman pump laser and at least one coupler. The detector is optically coupled with the separator and the processor is coupled with the detector. The probe source includes a probe laser for generating a probe light having a probe wavelength. The probe light is optically coupled into the optical fiber. The separator is for separating signal light originating in the optical fiber from light coupled into the optical fiber. The detector is for detecting the signal light and the processor is for analyzing the detected signal light. The Raman seed laser is for generating a respective Raman seed light having a respective seed wavelength and seed power and the Raman pump laser is for generating a respective Raman pump light having a respective pump wavelength and pump power. The coupler is for coupling the Raman pump laser and Raman seed laser to the optical fiber. The seed wavelength is between the pump wavelength and the probe wavelength. The respective Raman pump light, the respective Raman seed light and the probe light propagate along the optical fiber to achieve distributed Raman amplification of the signal light produced by the probe light as it propagates along the optical fiber.

In accordance with a further aspect of some embodiments, the fiber optic sensing system can further include a pump laser, coupled with an end of the optical fiber opposite an end the probe source is coupled with the optical fiber. The pump laser is for generating a pump light having a pump wavelength and the separator is further for coupling the pump light into the optical fiber. The signal light is the probe light as amplified by the pump light and at least one of the probe source and the pump laser is pulsed to have spatial resolution.

BRIEF DESCRIPTION OF THE DRAWINGS

Disclosed embodiments will be understood and appreciated more fully from the following detailed description taken in conjunction with the drawings in which.

DETAILED DESCRIPTION

Figure 1:
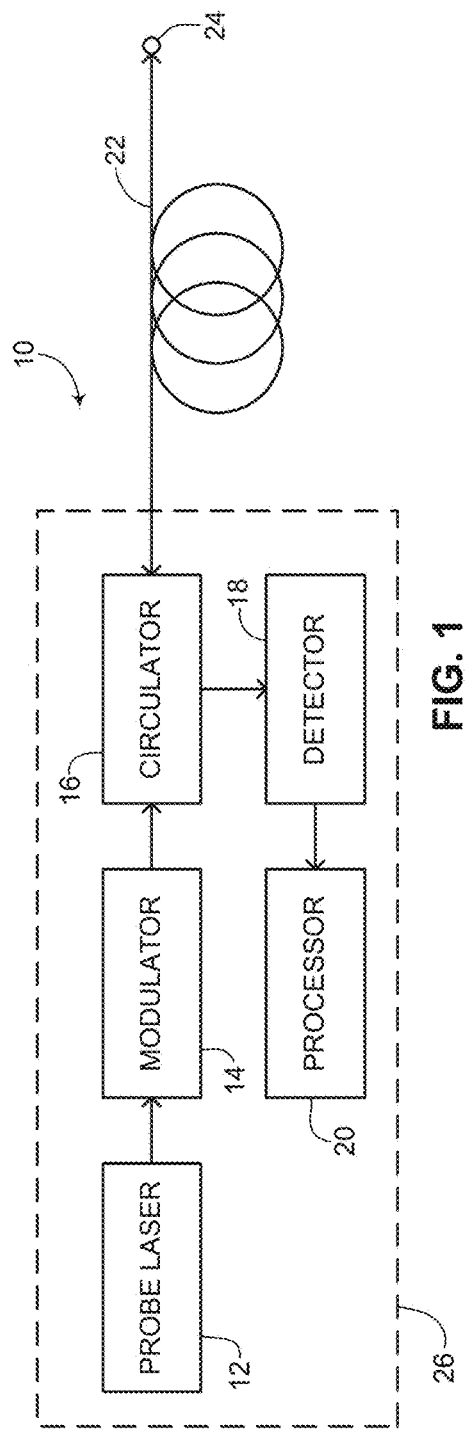
FIG. 1 is a schematic illustration of a fiber optic sensing system with no additional amplification, as is known in the art.

Some embodiments overcome the disadvantages of the prior art by providing a fiber optic sensing system and method using second order in-line Raman amplification to extend the amplification reach of a sensing system without the need to have access to both ends of the optical fiber and having dynamic control over the Raman gain. There is thus provided a fiber optic sensing system for exploiting in-line high order Raman amplification and a method for exploiting in-line high order Raman amplification in fiber optic sensor systems. This is achieved by a novel fiber optic sensing system configuration using two Raman lasers positioned in a single control unit or housing. Some embodiments provide independent power control of the second order Raman pump light and the first order Raman seed light, thus enabling the gain of the probe pulse and of the signal light to be controlled and tailor fit to a particular application of a fiber optic sensing system. According to some embodiments, by pumping the optical fiber with pump light that is shifted by multiple Raman scattering orders, it is possible to increase the input pump power and the distance where the Raman gain occurs down the optical fiber since according to some embodiments, the limiting factor is no longer first order spontaneous Raman scattering of the input pump light. This is because spontaneous Raman scattering of the pump light is at a wavelength that significantly differs from the probe light wavelength and the signal light wavelength and can therefore be filtered before detection. According to some embodiments, the wavelength of the pump light is shorter than the wavelength of the probe light, such that a corresponding frequency difference between the pump wavelength and the probe wavelength is a multiple of a frequency shift for which a Raman scattering coefficient is at least 25% of a resonant Raman scattering coefficient.

In addition, some embodiments allow for temporal control over the Raman gain, enabling different amplifications to the probe pulses and the measured signal in the case where the measured signal is counter-propagating to the probe pulses, such as in the case of Rayleigh or Brillouin back-scattered light or light reflected from an FBG.

The second order Raman laser pump power alone leads to very little gain in the probe pulse and the back-scattered signal. Some embodiments thus include a Raman seed laser and a Raman pump laser. The Raman seed laser stimulates the stimulated Raman scattering (SRS) of the Raman pump light into the first order Raman mode and thereby acts as a control and fine tuning for the Raman amplification of the probe light and the signal light.

The Raman seed laser mode (also referred to herein as the first order Raman mode) is amplified by the Raman pump laser by SRS as the light from both lasers propagates along the sensing optical fiber. As the first order Raman mode from the Raman seed laser is amplified, it provides amplification to the probe pulse and any back-scattered signal. The distance along the optical fiber wherein there is significant power in the first order Raman mode is determined by the pump power of the second order Raman mode as well as the seed power of the first order Raman mode. By varying the amount of pump power of the second order Raman mode and the power of the Raman seed laser, according to some embodiments, it is possible to set both the highest power of the first order Raman mode in the optical fiber as well as the location along the optical fiber at which this power and thus gain is achieved. Thus the amount of distributed amplification in a fiber optic sensing system can be tailored dynamically to a particular or specific use without requiring access to both ends of the optical fiber.

Increasing the power of the Raman pump laser or Raman seed laser, or tuning their wavelength closer to the Raman scattering resonance, increases the maximal power of the first order Raman mode seed pulses. The location of this maximum along the optical fiber can be increased by increasing the Raman pump laser power and decreasing the Raman seed laser power (or by tuning the wavelength difference between the Raman pump and the Raman seed lasers away from the Raman scattering resonance) accordingly. Using some embodiments, it is possible to bring the peak amplification to any desirable distance along the optical fiber up to a distance of over 20 km for second order Raman pumping. This maximal distance depends on the attenuation lengths of both the wavelengths of the Raman pump laser and the Raman seed laser as well as on the Raman order used, and can be extended even further by using higher order Raman pumping. Thus, a characteristic of the Raman seed light can be optimized to obtain amplification of the back-scattered signal light from a specific location along optical fiber 222. The characteristic can be the power and/or wavelength of the Raman seed light. As mentioned above, the power and/or wavelength of the Raman pump laser and/or Raman seed laser can be used to fine tune the sensing system and the nature of the in-line Raman amplification provided according to some embodiments. Examples of tuning the wavelength according to some embodiments can include tuning the pump wavelength to optimize a Raman scattering coefficient from the pump wavelength to the seed wavelength, tuning the seed wavelength to optimize the Raman scattering coefficient from either the pump wavelength to the seed wavelength, from the pump wavelength to between different seed wavelengths (in a case where more than one Raman seed laser is used) and from the seed wavelength to the probe wavelength. For example, with a 5 watt Raman pump using third order Raman pumping and Raman seed powers of 20 nanowatts and 10 nanowatts respectively in the second order and first order Raman seed lasers, it is possible to attain a maximal first order Raman mode of 400 mW at a distance of 30 km along the sensing fiber.

This control can be achieved without exceeding the threshold for spontaneous Raman scattering that will spectrally overlap with the probe or signal modes while simultaneously controlling the peak gain to the probe pulse to ensure that the probe pulse power level remains below the threshold at which non-linear phenomena begin to appear. This is in contrast to the prior art first order in-line Raman amplification sensing systems where the maximal gain of the probe pulse is necessarily at the point where the Raman pump laser is coupled to the optical fiber and the gain reach of the probe light is thus shortened.

According to some embodiments, the increased gain reach along the length of the optical fiber enables achieving higher power back-scattered signals that can be utilized for one or more of the following:
1. Increasing the length of optical fiber from which back-scattered signals can be differentiated from shot noise;
2. Improving the spatial resolution of the probe pulse by shortening probe pulse length;
3. Increasing the overall SNR of back-scattered signals for more accurate measurements of the measurand; and
4. Reducing the acquisition time of back-scattered signals, since less averaging or even no averaging is required, thereby increasing the bandwidth of the probe pulse measurement.

It is noted that some embodiments are described using an example of a second order Raman seed laser, however the fiber laser configuration of the fiber optic sensing system can be extended to higher order Raman mode scattering with higher Raman pump laser powers. As described below this is achievable, according to some embodiments, with the use of multiple Raman seed lasers for multiple Raman order scattering control. The control afforded by the Raman seed lasers together can be used to increase the distance of the first order Raman mode power along the optical fiber from where the Raman lasers are coupled with the optical fiber.

In order to enable a comparison of the performance of some embodiments with the described prior art, some embodiments are also described in the context of a direct-detection, phase OTDR system, in which one end of the optical fiber is inaccessible to electronics, optical pumping, communications and/or maintenance. However, some embodiments are not limited to such systems and can be used in other types of fiber optic sensing systems and detection systems. As mentioned above, one use of some embodiments is in situations and scenarios where one end of an optical fiber is inaccessible, such as deep drilling into the Earth's surface. Another use is in border monitoring where the number of control centers or stations is to be minimized. Some embodiments can be used in other scenarios where an amplifier should not or cannot be placed somewhere along the optical fiber for increasing the amplification reach.

In the case of border control, it is not desired to have to put up buildings every couple of kilometers or even tens of kilometers to be provided with electricity for amplifying a signal and then also requiring additional protection along the border to protect a building housing an amplifier. According to some embodiments, a regular fiber optic cable can be placed along a border, i.e., regular telecommunication cabling, not out of the ordinary, without the need to place many amplifiers along the border. If an amplifier is placed somewhere along the optical fiber, energy is needed for the amplifier, therefore even if maintainability is compromised and these amplifiers are placed underground to avoid the need to provide security for a visible building, each amplifier placed along an optical fiber increases the cost of the sensing system because power still needs to be brought to the amplifiers.

Other uses of some embodiments can include temperature checking along a large distance, monitoring railways, roads, pipelines and other infrastructures, including monitoring the stability of buildings, bridges and other large structures, pressure checking along a large distance as well as the flow of oil or other liquids in a pipe over a large distance. Large distance in this context can be hundreds to thousands of kilometers. According to some embodiments, other types of back-scattered signals besides Raman scattering can be used to determine a measurand along an optical fiber or can be used to extract information about a disturbance along an optical fiber. Some embodiments can be embodied using Rayleigh scattering in OTDR as well as in optical frequency domain reflectometry (herein abbreviated OFDR) systems. As mentioned above, a disturbance represents a change in the analyzed scatter pattern in a processor and can be caused by a change in temperature, a change in pressure or a change in other physical phenomena which can cause a local change in the index of refraction of the fiber or can affect a scatter pattern. Some embodiments can also be embodied using Brillouin scattering in OTDR systems. For example, Brillouin scattering shifts measure a change in temperature or strain so this phenomenon is good for uses where the measurand is temperature or strain. In such embodiments, the measured signal need not propagate backwards from the measurement point. In BOTDA (Brillouin optical time domain analysis), the measured signal is the forward propagating probe light that is amplified by a counter-propagating Brillouin pump light. In this embodiment, at least one of the probe laser and the pump laser (generating the Brillouin pump light) may be pulsed to have spatial resolution. Both can be amplified by some embodiments. It is noted as well that according to some embodiments, different received scatter patterns can be analyzed by a processor and can be categorized according to the type of object which caused the disturbance and the change in scatter pattern. For example, in a border crossing sensing systems, different scatter patterns may be identified as representing automobiles, animals, people and the like.

Figure 7:
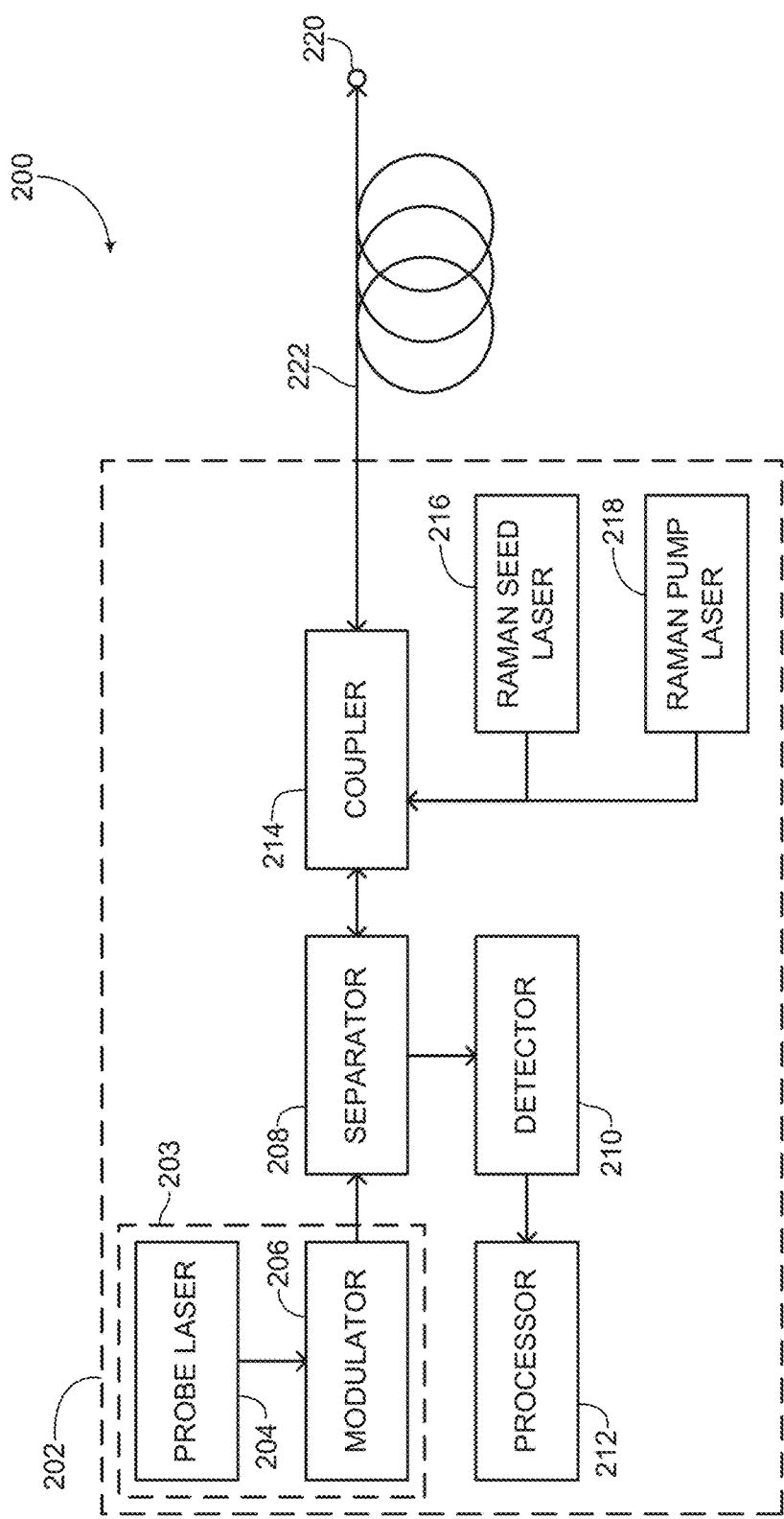
FIG. 7 is a schematic illustration of a fiber optic sensing system using second order in-line Raman amplification requiring access to only one end of an optical fiber, constructed and operative in accordance with an embodiment.

Reference is now made to FIG. 7, which is a schematic illustration of a fiber optic sensing system using second order in-line Raman amplification requiring access to only one end of an optical fiber, generally referenced 200, constructed and operative in accordance with an embodiment. Fiber optic sensing system 200 includes an interrogation unit 202 and an optical fiber 222. Interrogation unit 202 includes a probe source 203, a separator 208, a detector 210, a processor 212, a coupler 214, a Raman seed laser 216 and a Raman pump laser 218. Probe source 203 includes a probe laser 204 and a modulator 206. Modulator 206 is an optional component. Optical fiber 222 includes a fiber end 220, which may be inaccessible. Probe source 203 is coupled with separator 208. In one embodiment (as shown) modulator 206 is coupled with probe laser 204 and separator 208. Detector 210 is coupled with processor 212 and is optically coupled with separator 208 to receive and detect signals coming from separator 208. Coupler 214 is coupled with separator 208, Raman seed laser 216, Raman pump laser 218 and optical fiber 222. Interrogation unit 202 represents a control point, a control center or an access point for installation of the sensing system of some embodiments. For the purposes of simplicity, any amplification stages which might be used in fiber optic sensing system 200 either before providing the probe light into optical fiber 222 or before back-scattered light is provided to detector 210 is omitted.

Probe laser 204 can be embodied as any kind of narrow linewidth laser. Probe laser 204 may be a phase scanned laser, a phase modulated laser, a frequency modulated laser or an amplitude modulated laser. Probe laser 204 generates a probe light which travels along optical fiber 222 and which produces back-scattered light signals which are eventually received by detector 210. The probe light may be a continuous wave light or a light pulse. Modulator 206 is an optional component and is not essential to the configuration shown in FIG. 7. Modulator 206 can be any known modulator for modulating laser light such as an acousto-optic modulator, electro-absorption modulator or electro-optic modulator, and its use is dependent on the desired measurement scheme. For example, in OTDR systems, the modulator creates a probe pulse and determines the spatial resolution. The measured signal is then correlated to a location of the scattering event by a time of flight determination. In OFDR systems, the modulator is not used and the spatial correlation is determined according to the beating pattern of the signal and probe laser 204 which is a frequency swept laser in this case. Separator 208 is used to separate the forward propagating probe pulse from any back-scattered light coming from optical fiber 222. Separator 208 can be embodied as a circulator, a coupler, a WDM filter or any other known element which can separate forward propagating light beams from backward propagating light beams. Detector 210 can be any known light detector with a bandwidth ranging from a few megahertz (herein abbreviated MHz) to tens of gigahertz (herein abbreviated GHz). The kind of detector used for detector 210 may be among others a photodiode, avalanche photodiode and photo-multiplier tube. Coupler 214 couples the light pulses produced by Raman seed laser 216 and Raman pump laser 218 to optical fiber 222 and can be embodied as any type of light coupler. For example, coupler 214 may be a WDM, a 2×2 coupler and the like. Raman seed laser 216 and Raman pump laser 218 can each be embodied as diode lasers, Raman fiber lasers and the like. In one embodiment, Raman seed laser 216 may be embodied as a laser diode whereas Raman pump laser 218 may be embodied as a fiber laser, laser diode or Raman fiber laser. Raman pump laser 218 may operate in a continuous wave (herein abbreviated CW) mode or a pulsed mode. In the embodiments shown, Raman seed laser 216 is modulated and not pulsed, however in other embodiments it may be pulsed. As shown, interrogation unit 202 includes a single Raman pump laser and a single Raman seed laser, however in other embodiments of the disclosed technique, as described below, interrogation unit 202 may include a plurality of Raman seed lasers and/or Raman pump lasers, if higher order Raman amplification is desired. In the embodiment shown, both Raman seed laser 216 and Raman pump laser 218 are coupled with coupler 214 after separator 208. In other embodiments, Raman seed laser 216 and Raman pump laser 218 can be coupled between separator 208 and modulator 206 (not shown). Raman seed laser 216 and Raman pump laser 218 can also be coupled separately to optical fiber 222 (not shown), with each of Raman seed laser 216 and Raman pump laser 218 being coupled via a separate coupler (not shown). In addition, in the configuration shown in FIG. 7, Raman seed laser 216 and Raman pump laser 218 are coupled to one end of optical fiber 222 such that fiber end 220 can remain inaccessible. In other embodiments, one of Raman seed laser 216 or Raman pump laser 218 can be coupled with fiber end 220 (not shown). Whereas such a configuration loses the advantage of only requiring access to one end of optical fiber 222, such a configuration has the advantage of achieving an even longer reach along the optical fiber as opposed to the configuration shown in FIG. 7. The configuration shown in FIG. 7 uses direct detection of the signal (i.e., back-scattered light). In additional embodiments, the signal is combined with the output of probe laser 204 to enable coherent detection on a single detector or balanced detector (shown as detector 210). This signal is the signal separated out by separator 208. In general, detection may be homodyne detection or heterodyne detection. Also, the signal light which is detected by detector 210, depending on the particular use of the sensing system of FIG. 7, may be reflected light, amplified light, back-scattered light, forward-scattered light, Raman scattered light, Brillouin scattered light or Rayleigh scattered light generated from the probe light produced by probe laser 204. The detected signal is provided from detector 210 to processor 212 which can analyze the detected signal light to obtain information regarding optical fiber 222, an environment where optical fiber 222 is positioned or both. It is noted as well that the detected signal may be correlated with the probe light or probe pulse. This is done in order to reduce the time between probe pulses and can be embodied by encoding each probe pulse with a pattern. Thus, a number of probe pulses can be transmitted in a single roundtrip time. Ambiguity in the signal light between the various probe pulses transmitted within a single roundtrip time can be removed by correlation of the received signal light with the different patterns.

According to some embodiments, laser light at two different wavelengths is coupled with optical fiber 222 while probe laser 204 provides probe light to optical fiber 222 that may be turned into probe pulses by modulator 206. Raman pump laser 218 provides pump light whereas Raman seed laser 216 provides seed light. Raman pump laser 218 provides high power light whereas Raman seed laser 216 provides lower power light. In one embodiment, the Raman pump laser provides pump light throughout the measurement cycle with the Raman seed laser only providing seed pulses between the probe pulses. In another embodiment, the Raman seed light power is decreased during probe pulses but not to zero. This is done to prevent the seed pulses from increasing the power of the probe pulses above a threshold at which non-linear phenomena may occur within optical fiber 222. In one embodiment, Raman pump laser 218 provides light pulses having a power of between 50 mW up to 10 watts, whereas Raman seed laser 216 provides light pulses having a power of less than 10 mW. In general, a characteristic of the seed light produced by Raman seed laser 216 and/or the pump light produced by Raman pump laser 218 can be modulated in correlation with changes to the power in the probe light. The characteristic can either be the power and/or the wavelength of the Raman seed laser and/or the Raman pump laser. This is done in order to avoid high power in the probe light which can cause the occurrence of non-linear phenomena in anywhere along optical fiber 222. The high power light provided by Raman pump laser 218 is provided with a wavelength shift of nearly twice the Raman shift of the probe light. For example, if probe laser 204 produces light having a wavelength of 1550 nanometers (herein abbreviated nm), then Raman pump laser 218 can generate pump light having a wavelength ranging from 1340-1400 nm with a Raman shift ranging from 150-210 nm (equivalent to a frequency shift of between 20-30 terahertz (herein abbreviated THz)). Raman pump laser 218 could then have a power ranging from 50 milliwatts to 10 watts. The low power light provided by Raman seed laser 216 is provided with a wavelength near the Stokes Raman peak of the pump light and a Stokes Raman wavelength shift near the wavelength of the probe light. For example, if probe laser 204 produces probe light having a wavelength of 1550 nm, then Raman seed laser 216 can generate seed light having a wavelength ranging from 1430-1500 nm with a Raman shift ranging from 50-120 nm (equivalent to a frequency shift of between 7-16 THz). Raman seed laser 216 could then have a power of less than 10 milliwatts. In general the wavelength of the seed light should be between the wavelength of the pump light and the wavelength of the probe light. As mentioned above, the wavelengths of the probe light, the Raman pump light and the Raman seed light need to be selected within a particular range and relationship in order for the disclosed technique to achieve the required second order in-line Raman amplification. In general, according to some embodiments, the wavelength of the pump light is shorter than the wavelength of the probe light, such that a corresponding frequency difference between the pump wavelength and the probe wavelength is a multiple of a frequency shift for which a Raman scattering coefficient is at least 25% of a resonant Raman scattering coefficient. In one embodiment, the pump wavelength, seed wavelength and probe wavelength are selected such that a corresponding frequency difference between the pump wavelength and the probe wavelength is twice a frequency shift for which a Raman scattering coefficient (or a single order Raman scattering coefficient) is at least 25% of the resonant Raman scattering coefficient. In this embodiment, the wavelengths are also chosen such that the frequency difference between the seed wavelength and the probe wavelength and between the seed wavelength and the pump wavelength is a frequency shift for which the Raman scattering coefficient is at least 25% compared to a resonant Raman scattering frequency shift. It is noted that in one embodiment, the power of probe laser 204 should not exceed 1 watt.

It is desirable to have a well distributed gain throughout the optical fiber in order to overcome the attenuation of both the probe pulses and the back-scattered light. According to some embodiments, the Raman pump light and the Raman seed light interact together in the sensing fiber to achieve distributed Raman amplification of the back-scattered light (i.e., the signal light) generated from the probe light as it propagates along the sensing fiber. Using Raman pump laser 218 and Raman seed laser 216, the gain provided to optical fiber 222 can be adjusted and tailored depending on the use of fiber optic sensing system 200. For example, by increasing the power of the pump light and decreasing the power of the seed light, the gain can be moved forward along the optical fiber. However, by decreasing the power of the pump light and increasing the power of the seed light, the gain can be moved backward along the optical fiber closer towards coupler 214. It is noted that in one embodiment of the disclosed technique, the length of optical fiber 222 should be greater than 10 km and optical fiber 222 should be embodied as a single mode optical fiber.

It is noted that in the sensing system of FIG. 7, Raman seed laser 216 and Raman pump laser 218 are co-propagated with the light generated by probe laser 204. As mentioned above, in other embodiments, at least one of Raman seed laser 216 and Raman pump laser 218 (or both) are also coupled with fiber end 220. In such an embodiment, the seed light and/or the pump light may be co-propagated with the probe light, counter-propagated with the probe light or bi-directionally propagated with the probe light.

Figure 8:
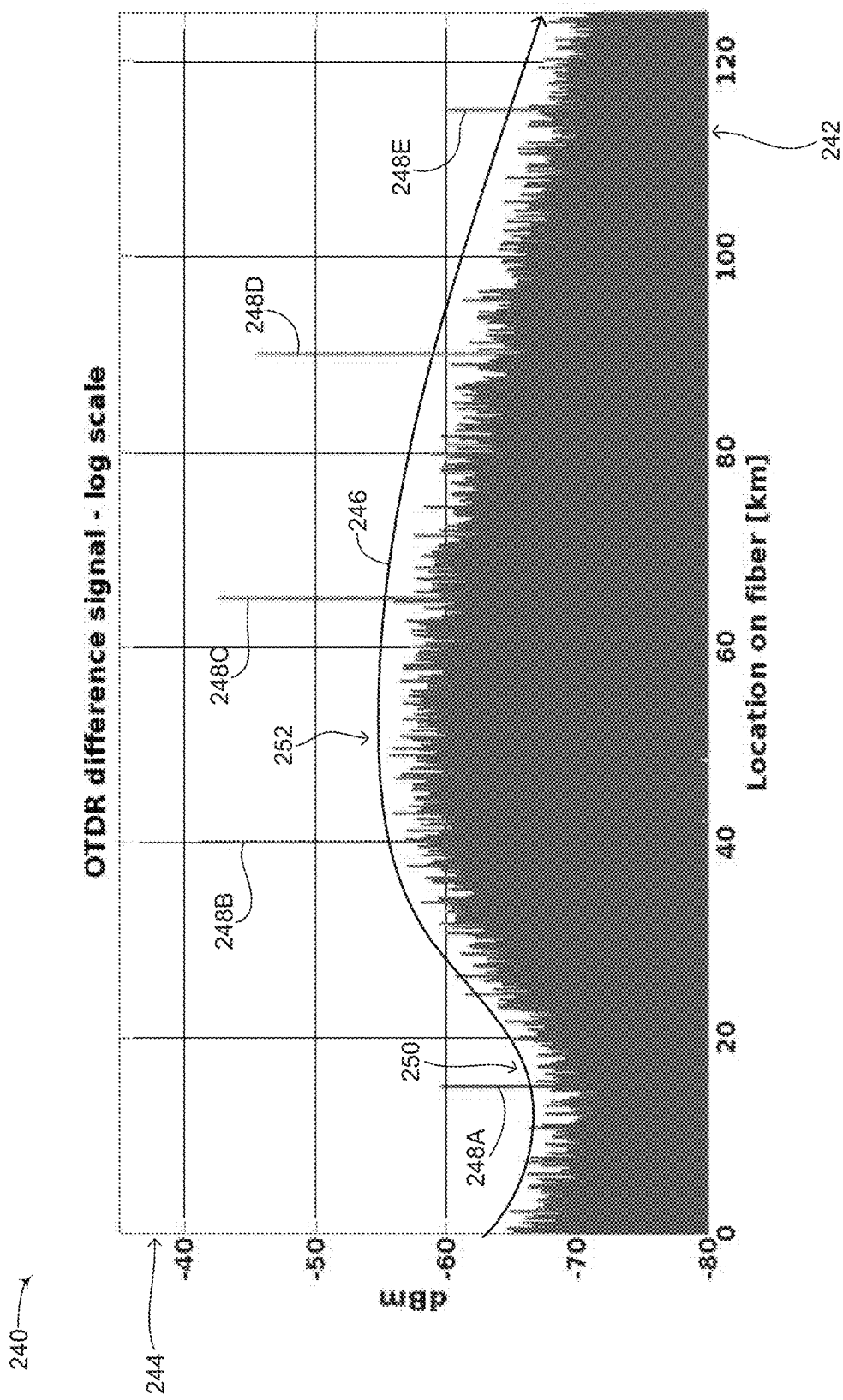
FIG. 8 is a graph of a simulation using the fiber optic sensing system of FIG. 7 of the disclosed technique, showing the absolute value of the difference between two consecutive probe light measurements on a logarithmic scale, constructed and operative in accordance with another embodiment.

Reference is now made to FIG. 8, which is a graph of a simulation using the fiber optic sensing system of FIG. 7 of some embodiments, showing the absolute value of the difference between two consecutive probe light measurements on a logarithmic scale, generally referenced 240, constructed and operative in accordance with another embodiment. Graph 240 includes an X-axis 242, showing distance in kilometers along an optical fiber (for example, optical fiber 222 of FIG. 7), and a Y-axis 244, showing the power in dBm. The simulation as shown has been designed to exhibit disturbances between measurements along the optical fiber at the following distances: 15 km, 40 km, 65 km, 90 km and 115 km. The simulation shown in FIG. 8 uses the same parameters as the simulation shown above in FIG. 2, however with the following additional parameters. The power of the Raman pump laser was set to 1.9 watts, producing second order Raman pump light, the power of the Raman seed laser was set to 22 nanowatts when the probe pulses are generated and to 1 microwatt at other times, producing first order Raman mode light. These pump powers were chosen to prevent the first order Raman mode light from passing the 400 mW limit for spontaneous Raman scattering at all locations along the optical fiber and to prevent the probe pulse power from passing the 5 mW limit above which non-linear phenomena will begin to occur.

Figure 2:
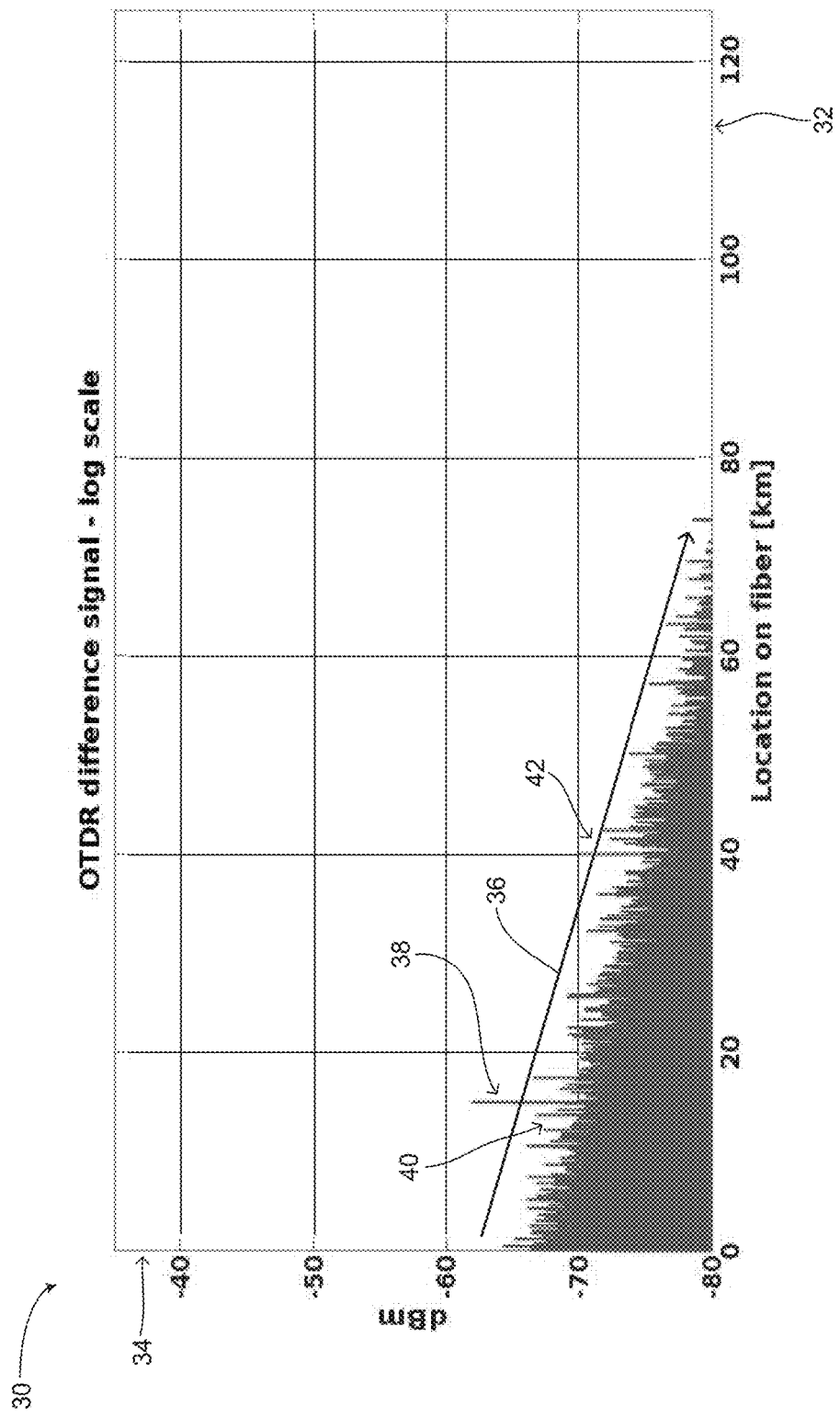
FIG. 2 is a graph of a simulation using the fiber optic sensing system of FIG. 1, showing the absolute value of the difference between two consecutive probe light measurements on a logarithmic scale, as is known in the art.
Figure 4:
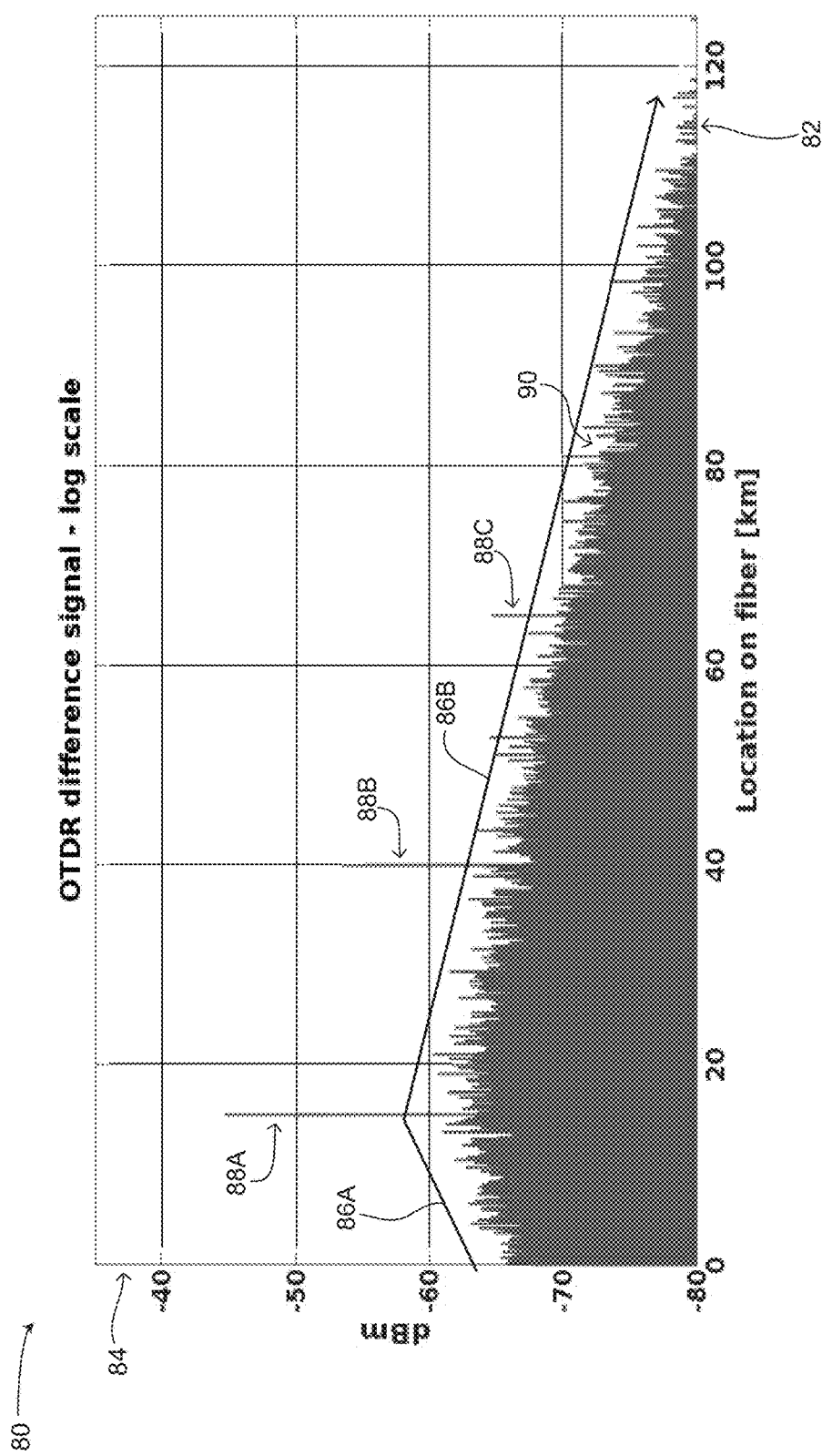
FIG. 4 is a graph of a simulation using the fiber optic sensing system of FIG. 3, showing the absolute value of the difference between two consecutive probe light measurements on a logarithmic scale, as is known in the art.
Figure 6:
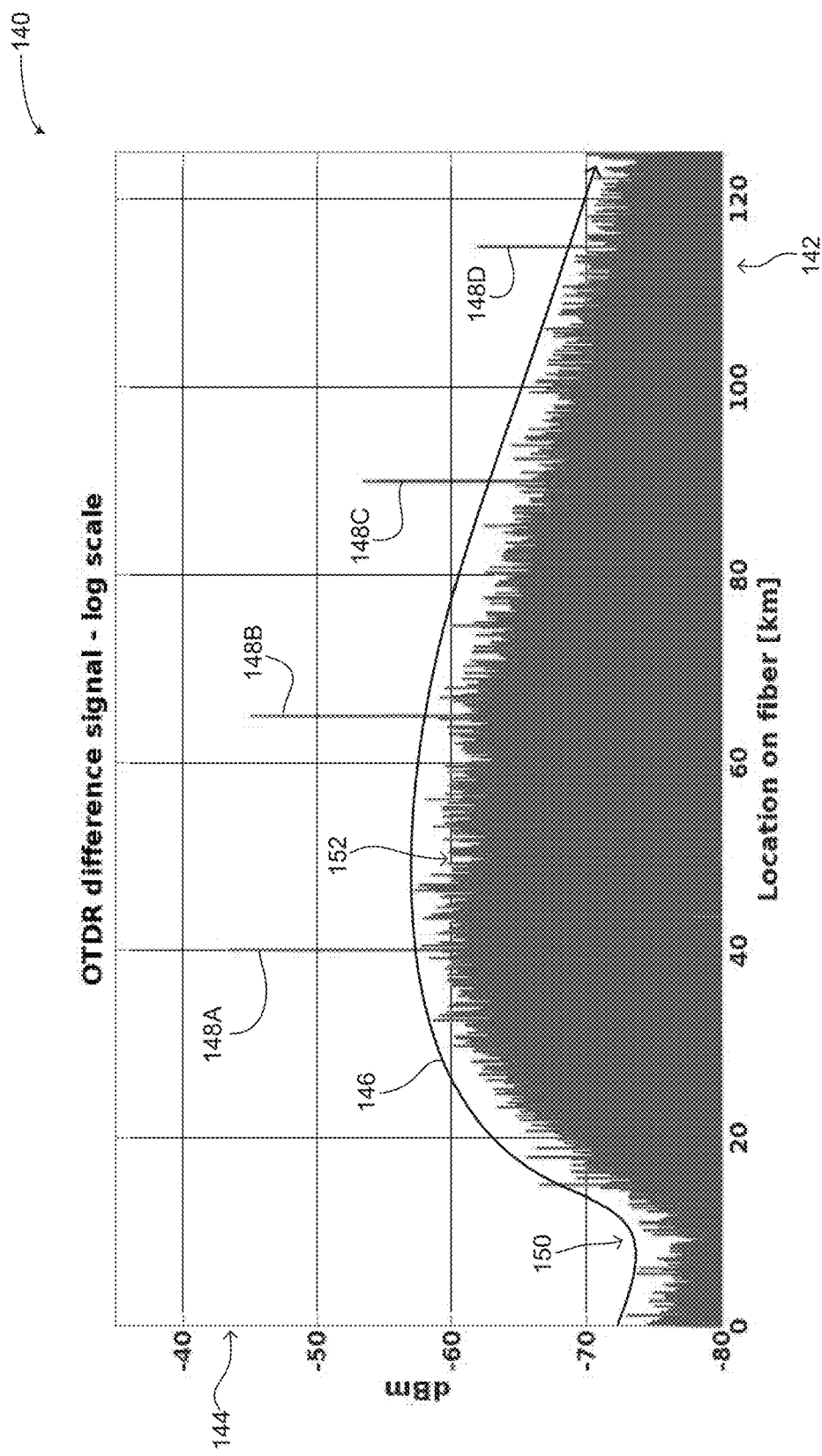
FIG. 6 is a graph of a simulation using the fiber optic sensing system of FIG. 5, showing the absolute value of the difference between two consecutive probe light measurements on a logarithmic scale, as is known in the art.

As can be seen, an envelope 246 shows a relatively flat power level of the noise (showing a variation of approximately 10 dB), indicating a relatively flat power level (showing a variation of approximately 20 dB) as compared to the envelopes shown in FIGS. 2, 4 and 6 above which represent the prior art. Envelope 246 eventually attenuates as well to levels where the shot noise is comparable to the signal level however this is at distances nearing 150 km. Disturbance peaks at the designed distances of 15 km, 40 km, 65 km, 90 km and 115 km are clearly visible, shown by arrows 248A, 248B, 248C, 248D and 248E. A dip in the back-scattered power is shown by an arrow 250 whereas a maximum in back-scattered power is shown by an arrow 252. This dip and maximum are adjustable and fine-tunable according to some embodiments by adjusting the power levels of the first order Raman mode seed power and the second order Raman pump power. Increasing the pump light power and decreasing the seed light power moves the maximum in probe pulse power (shown by arrow 252) further along the optical fiber, whereas decreasing the pump light power and increasing the seed light power moves the maximum in probe pulse power (shown by arrow 252) backwards along the optical fiber and decreases the dip shown by arrow 250. As explained above, some embodiments use controllable second order Raman scattering to create a well distributed gain that reaches deep into the optical fiber. Control over both the Raman pump light power and the Raman seed pulse power allows for the distribution of the gain to be dynamically adjusted for optimal amplification of the probe pulse and of the back-scattered light signal.

Figure 3:
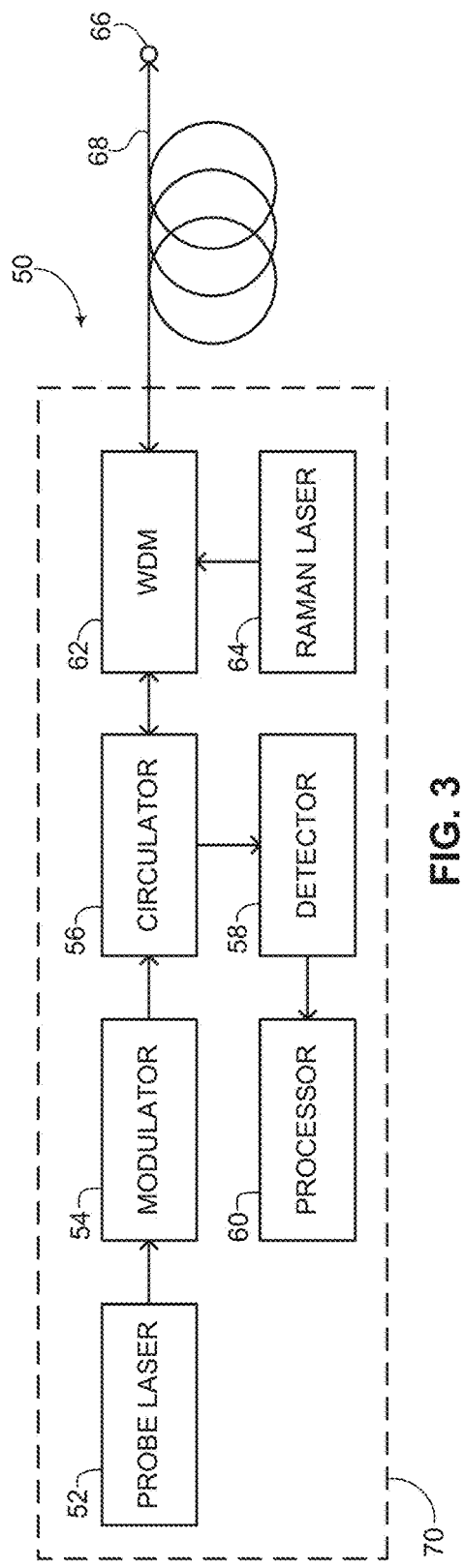
FIG. 3 is a schematic illustration of a fiber optic sensing system using in-line Raman amplification, as is known in the art.
Figure 9:
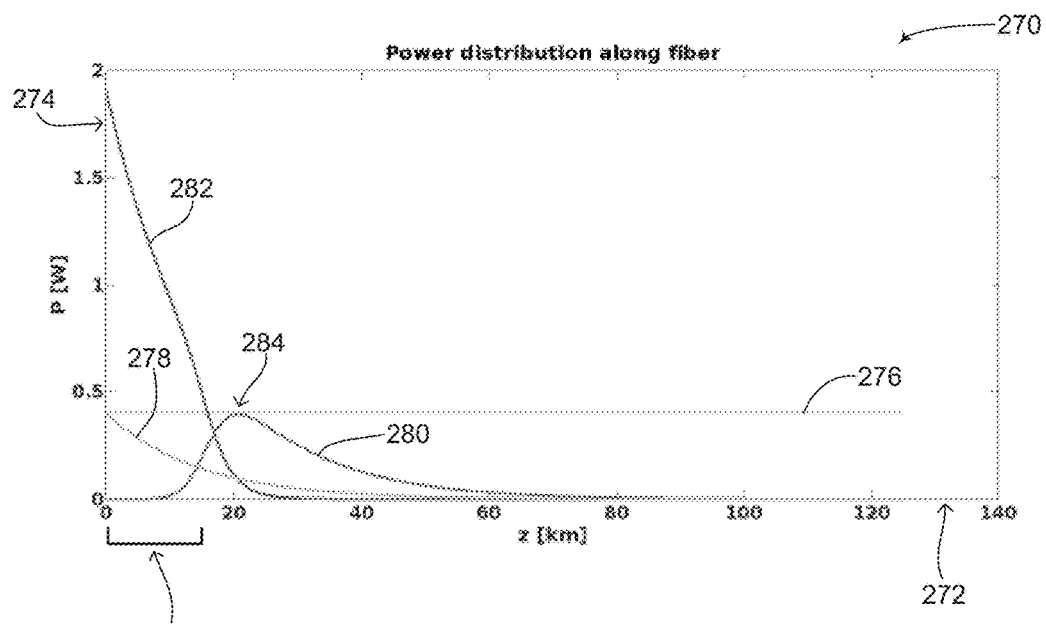
FIG. 9 is a graph showing changes in the power of the different Raman modes along the length of an optical fiber using the sensing system described in FIG. 7 and the prior art sensing system described in FIG. 3, constructed and operative in accordance with a further embodiment.

Reference is now made to FIG. 9, which is a graph showing changes in the power of the different Raman modes along the length of an optical fiber using the sensing system described in FIG. 7 and the prior art sensing system described in FIG. 3, generally referenced 270, constructed and operative in accordance with a further embodiment. FIG. 9 describes the changes in the power of the different Raman modes as they propagate down the optical fiber using the sensing system of FIG. 7 assuming the back-scattered signal power is relatively small (as is shown in FIG. 8) and does not deplete the first order Raman mode power. For comparison purposes, FIG. 9 also shows the power distribution of the Raman pump light for in-line Raman amplification using the prior art sensing system of FIG. 3.

Graph 270 includes an X-axis 272 showing distance along an optical fiber in kilometers and a Y-axis 274 showing power in watts. A line 276 shows a threshold for spontaneous Raman scattering of 400 mW above which spontaneous Raman scattering from the first order Raman mode can decrease the SNR. A line 278 represents the power of a prior art first order Raman mode power, a line 280 represents the power of the first order Raman mode power of some embodiments as shown in FIG. 7 and a line 282 represents the power of the second order Raman mode pump of some embodiments as shown in FIG. 7. As shown in line 282, the initial power of the second order Raman mode pump light is allowed to exceed the 400 mW threshold shown by line 276 by a factor of five (close to 2 watts) since the spontaneous Raman scattering must remain small compared to the first order Raman mode rather than the low power of the back-scattered signals. Line 282 shows the attenuation of the second order Raman mode pump light with an attenuation constant of 0.3 dB/km due to SRS. In addition, using SRS, power is transferred from the second order Raman pump light to the first order Raman seed light, as shown by the maximum of line 280, shown as arrow 284. The maximum of the first order Raman seed mode power is limited to the power shown by line 276 to prevent spontaneous Raman scattering. The initial powers of the Raman seed mode (line 280) and the Raman pump mode (line 282) determine the location and the amplitude of the peak power (arrow 284) of the first order Raman seed mode. In FIG. 9, a Raman seed power of 1 microwatt was chosen so that the first order Raman seed mode power reaches a maximum power of 400 mW at a distance of just over 20 km along the optical fiber. As mentioned above, for comparison purposes, the power of a first order Raman mode power for in-line amplification as shown in the prior art sensing system of FIG. 3 is shown as a line 278, having the same peak power of 400 mW as the maximal peak power of the seed light of some embodiments and attenuates along the length of the optical fiber. The Raman gain provided to the probe pulse is proportional to the power of the first order Raman mode pump lights, shown as lines 278 (in the case of the prior art) and 280 (in the case of some embodiments). As seen in FIG. 9, some embodiments have the following advantages over the prior art. First, the peak gain of the first order Raman mode is deeper into the optical fiber. Second, the gain curve has a long tail into the optical fiber. As a reference, the power at which Raman amplification exactly cancels the attenuation along the optical fiber of 0.2 dB/km is 60 mW. While this power level is reached at around 30 km with prior art in-line Raman amplification sensing systems, some embodiments and amplification scheme enables this gain to be achieved over 50 km. The overall gain provided to the probe pulse at every point from 15 km and above is higher using the second order Raman mode seed light amplification of some embodiments. Even the lower amplification of some embodiments compared to the first order Raman mode pumping of the prior art nearer to the detector of the sensing system, shown by an arrow 288, has an advantage. Since the initial pump light power (line 280) is very low and does not amplify near the fiber end closest to a coupler (not shown), amplification of the probe pulse is possible without reducing the initial peak power of the probe pulse.

Figure 5:
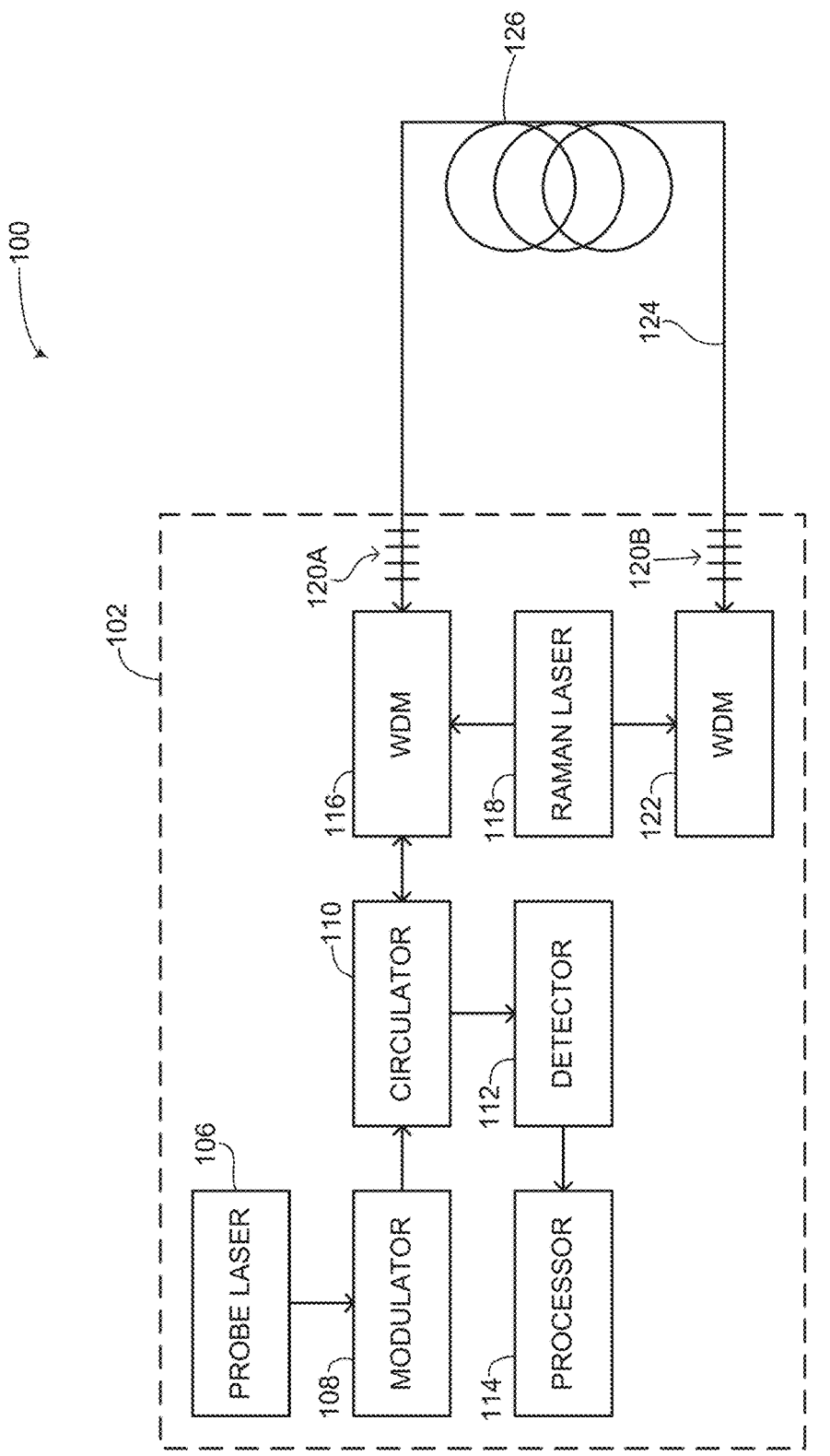
FIG. 5 is a schematic illustration of a fiber optic sensing system using second order in-line Raman amplification, as is known in the art.
Figure 10:
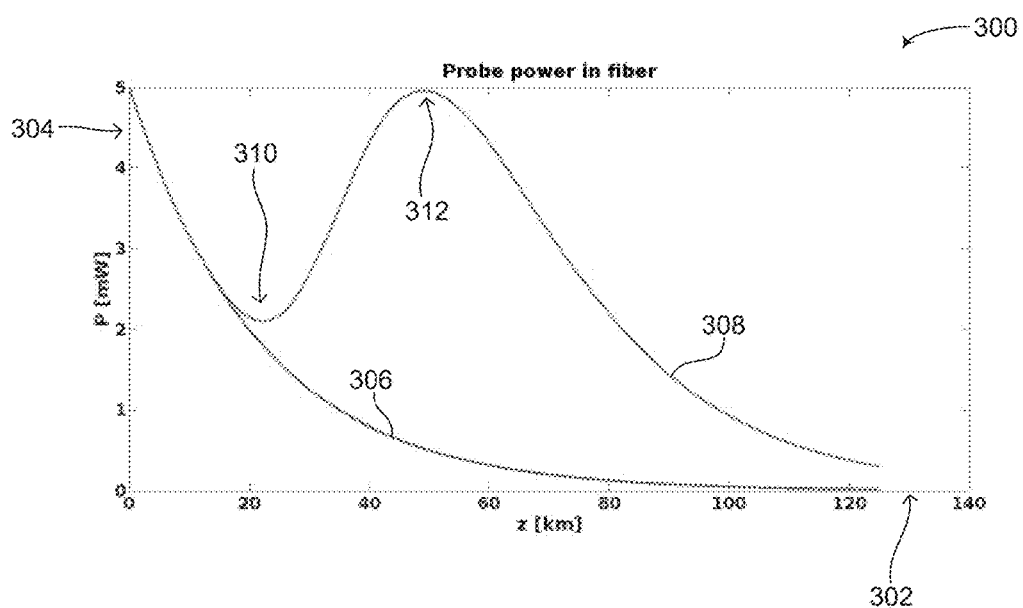
FIG. 10 is a graph showing the amplification of a probe pulse along an optical fiber using the Raman amplification described above in FIGS. 7-9, constructed and operative in accordance with another embodiment.

Reference is now made to FIG. 10, which is a graph showing the amplification of a probe pulse along an optical fiber using the Raman amplification described above in FIGS. 7-9, generally referenced 300, constructed and operative in accordance with another embodiment of some embodiments. Graph 300 was generated using the same parameters for fiber optic sensing system 200 (FIG. 7) as was used in the simulation shown above in FIG. 8. Graph 300 includes an X-axis 302 showing distance along an optical fiber in kilometers and a Y-axis 304 showing power in milliwatts. A line 306 shows the power of a probe pulse as it propagates along an optical fiber without amplification, such as described above in the prior art sensing system of FIG. 1. A line 308 shows the power of a probe pulse amplified by a first order Raman mode seed light (not shown) having an input power of 22.5 nanowatts so that the power of the probe pulse does not exceed a threshold of 5 mW. Similar to line 306, the power of line 308 attenuates with distance, as shown by an arrow 310, however since the amplification according to some embodiments pushes the gain along the optical fiber, the power of the probe pulse is amplified some distance along the optical fiber, as shown by an arrow 312, peaking around 50 km along the optical fiber. While the power of the probe pulse is attenuated by about 0.3 dB/km in the prior art (line 306), some embodiments enable the probe pulse power to remain above 10% of the threshold value (around 0.5 mW) up to a distance of over 100 km. This tailored differential amplification of the probe pulse and the back-scattered signal is not possible using prior art techniques. The prior art system of FIG. 3 does not have the reach of amplification as shown, while the prior art system of FIG. 5 lacks the freedom of temporal control over the Raman seed mode needed for the differential amplification.

Figure 11:
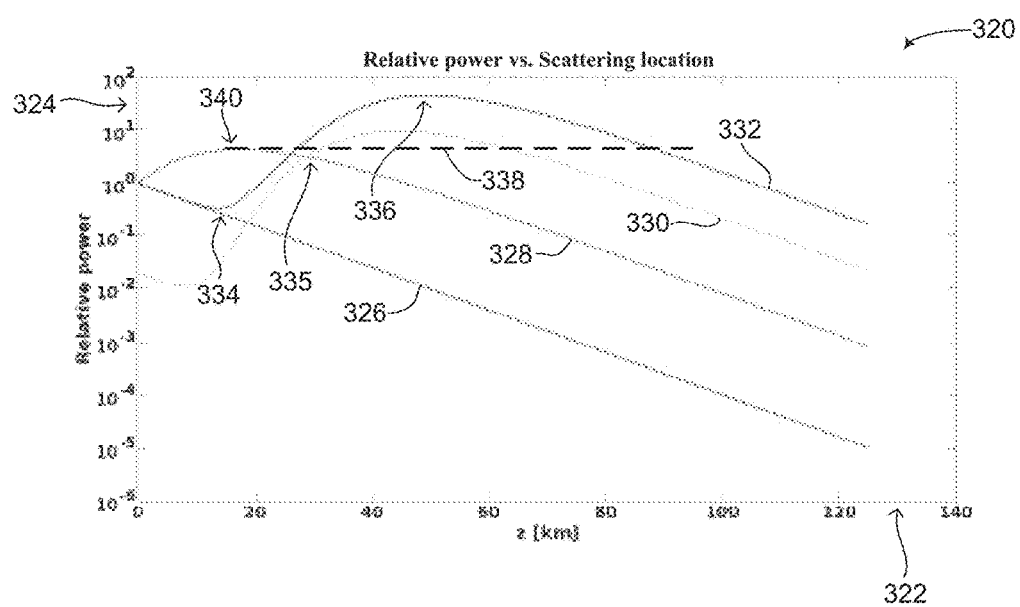
FIG. 11 is a graph showing the theoretical average power of back-scattered signals that reach a detector considering the probe pulse power shown in FIG. 10 and the back-scattered gain shown in FIG. 9 as a function of the location of the back-scattering signal in the optical fiber as compared to the prior art, constructed and operative in accordance with a further embodiment.

Reference is now made to FIG. 11, which is a graph showing the theoretical average power of back-scattered signals that reach a detector considering the probe pulse power shown in FIG. 10 and the back-scattered gain shown in FIG. 9 as a function of the location of the back-scattering signal in the optical fiber as compared to the prior art, generally referenced 320, constructed and operative in accordance with a further embodiment. Graph 320 includes an X-axis 322 representing a distance along an optical fiber from which back-scattered signal propagate towards a detector (not shown) in a sensing system and a Y-axis 324 representing power relative to a common reference power. A line 326 represents the average power of a back-scattered signal reaching the detector without any amplification (such as in the prior art sensing system of FIG. 1). A line 328 represents the average power of a back-scattered signal reaching the detector using only first order Raman amplification (such as in the prior art sensing system of FIG. 3). A line 330 represents the average power of a back-scattered signal reaching the detector using second order Raman amplification wherein the Raman seed mode is generated by FBGs forming a UFRL (such as in the prior art sensing system of FIG. 5) and only the end of the optical fiber is pumped. A line 332 represents the average power of a back-scattered signal reaching the detector using the amplification scheme of some embodiments, wherein the power of the pump light and the seed pulse are independently controlled (such as in the sensing system of FIG. 7).

Lines 326, 328, 330 and 332 represented in FIG. 11 are shown on a logarithmic scale divided by the back-scattered signal resulting from a 5 mW probe pulse at the point of the optical fiber closest to the interrogator unit (not shown). In the case of no Raman amplification (line 326), the back-scattered signal decays along the optical fiber with an attenuation of 0.4 dB/km, which is due to an attenuation of 0.2 dB/km for each of the probe pulse and the back-scattered signal. In the case of first order Raman amplification (line 328), there is an initial increase in the back-scattered signal up to about 17 km, shown by an arrow 340, at which point the signal begins to decay. In the case of prior art second order Raman amplification (line 330), the relative power is substantially lower than even the case of no amplification because of the low probe pulse power required to avoid the non-linear threshold with in-line amplification, however a sharp increase begins around 20 km and surpasses the back-scattered signal of first-order amplification around 30 km (shown by an arrow 335). In some embodiments (line 332), the back-scattered signal initially decreases but around 15 km increases, shown by an arrow 334 and reaches a peak around 50 km, shown by an arrow 336. A line 338 shows the maximum back-scattered signal power using only first order Raman amplification. As shown by line 338, the back-scattered signal power using the Raman amplification of some embodiments remains higher than the maximal back-scattered signal power of the first order Raman amplification up to around 90 km. After Raman amplification, all the back-scattered signals decay at a rate of 0.4 dB/km, however the overall signal power of the back-scattered signal of some embodiments remain more than 8 dB larger along the optical fiber, even as the back-scattered signal attenuates, as compared to the Raman amplification schemes of the prior art. The parameters chosen for the simulation shown in FIG. 11 are typical values thus presenting the benefits of some embodiments over the prior art.

It is noted that some embodiments are not limited to the parameters chosen for the generation of graph 320, including the selected powers of the probe laser, the Raman pump laser and the Raman seed laser. The graphs shown in FIGS. 8-11 were merely brought as examples of the benefits and uses of some embodiments. According to some embodiments, Raman amplification using N-order amplification is used to control the gain provided to a probe pulse in a fiber optic sensing system, where N is two or more. In general, according to some embodiments, a Raman pump laser is used having a wavelength such that the $N^{th}$ Raman scattering resonance coincides with the wavelength of the probe light. Raman seed lasers are used with wavelengths close to all the intermediate N−1 Raman scattering resonances of the Raman pump light. Raman pump lasers can be coupled to either one or both ends of the sensing optical fiber. The power in the Raman seed lasers may be modified in accordance with the probe pulse power, thus optimizing the gain amplitude and distribution for both the probe pulse and the back-scattered signal. As mentioned above, for example, the higher order seed lasers (which may be one seed laser or more) may be turned off during the transmission of the probe pulse to prevent Raman amplification of the probe pulse. Alternatively, the higher order seed light powers may be set such as to provide substantial gain only at a distance where the probe pulse power is significantly attenuated. In one embodiment, the Raman pump laser and the Raman seed lasers all co-propagate with the probe laser. In other embodiments in which the far end of the sensing fiber is accessible, the Raman pump laser and the Raman seed lasers can be coupled to both ends of the sensing fiber. It is possible to control the differential gain to the probe pulse and the back-scattered light by dynamically changing the power of the Raman seed light, shifted by one Raman resonance from the probe light. It is thus possible in one embodiment to either replace all the Raman seed lasers but one or replace some of the Raman seed lasers using at least one FBG pair positioned on both ends (one on each end) of the sensing fiber (provided they are accessible), thereby forming a multiple order URFL according to some embodiments. In such an embodiment, each FBG in each FBG pair should have a high reflectivity at wavelengths with at least 25% Raman scattering efficiency of a resonant Raman scattering on orders at which the Raman seed light generated by a Raman seed laser is not generated.

As mentioned above, higher order Raman amplification (i.e., third order and above) can be used if the gain reach is to extend beyond 50 km. For example, third order Raman amplification is possible with a pump diode having a wavelength such that the third order Raman scattering resonance coincides with the wavelength of the probe pulse. As mentioned, in this case two Raman seed lasers (not shown) can be used, with the first one near the first Raman scattering resonance of the pump diode and with the second one near the second Raman scattering resonance of the pump diode. In another embodiment of higher order Raman amplification of some embodiments, one of the Raman seed lasers can be replaced by an FBG pair at the optical fiber ends, thus using the power levels of the third order Raman pump laser and Raman seed laser to control the maximal power and location of the Raman gain for the probe pulse and/or the back-scattered signal. However in this embodiment, access to both ends of the optical fiber is required.

As is understood, some embodiments can be used in OTDR systems, OFDR systems, BOTDA systems, BOTDR systems, forward-propagating sensing systems as well as backward-propagating sensing systems.

As shown in FIG. 11, the gain of the second order Raman amplification, either by the prior art (line 330) or according to some embodiments (line 332), is lower than that of the first order Raman amplification (line 328) for the first approximately 25 km of the optical fiber. According to the disclosed technique, amplification in this region is possible as follows. Since this section of the optical fiber is nearest to the detector of the sensing system (not shown), it is possible to add an additional pump laser to the fiber optic sensing system 200 (FIG. 7), coupled with coupler 214 (FIG. 7) to act as additional amplification to deliver gain to the end of optical fiber 222 (FIG. 7) nearest to coupler 214. In one embodiment, this additional pump laser may be a Brillouin pump laser having a wavelength shift of approximately 10 gigahertz (herein abbreviated GHz) as compared to the wavelength of probe laser 204 (FIG. 7). This Brillouin pump laser forms a distributed amplifier for the back-propagating signal in sensing fiber 222. SBS phase matching causes amplification of the signal mode propagating in a direction opposite to the direction of the Brillouin pump laser. In this embodiment, the Brillouin pump laser can amplify the back-scattered signal in the region near the optical fiber end closer to detector 210 (FIG. 7). In another embodiment, instead of using a Brillouin pump laser, if better SNR is required in the region closest to detector 210, for example, up to around 25 km along the optical fiber from the detector, then proper setting of the parameters of the first order Raman mode seed laser and the second order Raman mode pump laser can result in a peak gain closer to the detector. As described above, increasing the seed pulse power and decreasing the pump light power moves the peak gain backwards along the optical fiber closer to the detector. These power parameters can be changed dynamically to increase the SNR in different regions over the length of the optical fiber. In one embodiment, these power parameters can be changed periodically in order to have an accurate measurement of the measurand along the entire length of the optical fiber. In another embodiment, these power parameters can be changed upon demand, such as in the case of a possible event or disturbance.

As shown in FIG. 8-11, disturbances can be detected up to a range of about 150 km using some embodiments without the use of external amplification units and only requiring access to one end of an optical fiber. By placing two fiber optic sensing systems as shown in FIG. 7 back-to-back, each facing a different direction, in ultra-long distance applications, control centers or control points housing the sensing system of FIG. 7 may be placed only once every 300 km without any need for amplification, maintenance or communication centers in between.

In one embodiment, as described above in FIGS. 7-11, since a Raman seed laser is used, some embodiments do not rely on reflections from the optical fiber end at wavelengths within the first order Raman shift, as does the prior art, such as in URFL systems. In this embodiment, access to both ends of the optical fiber is not required and it is possible to use some embodiments for increased gain reach along the optical fiber from a single end. However in another embodiment, FBGs can be placed on either end of the optical fiber. In this embodiment, access to both ends of the optical fiber is required. The advantage of this embodiment is that the overall cost of the elements of the fiber optic sensing system may be more cost effective than the sensing system shown in FIG. 7, however access to both ends of the optical fiber is required.

As explained above, some embodiments enable the dynamic control of the peak gain location along a sensing fiber using N-order Raman amplification. It is noted however that the detected quantity of the disclosed technique is not limited to a back-scattered signal detected by the detector and analyzed by the processor. For example, the detector and processor may analyze the detected back-scattered signal for Rayleigh scattering, Raman scattering or Brillouin scattering to determine if a disturbance or event has occurred along the length of the optical fiber, or to measure a property of the fiber or the surrounding environment, such as temperature, pressure waves, acoustic waves or ultra-sonic waves. The processor may analyze the received intensity pattern, phase or frequency of the measured light, or a combination of these attributes and quantities. The analyzed signal need not be light scattered from the probe light and could be the probe power itself that is transmitted through the sensing fiber. For example, in Brillouin OTDA, the signal is the probe light itself. In such uses of some embodiments, the processor analyzes the peak response to stimulated Brillouin scattering from a Brillouin pump laser into the probe mode, as a function of the probe laser frequency.

According to some embodiments, the characteristics of probe laser 204 (FIG. 7) are to be selected in accordance with the characteristic or quantity to be detected and the type of scattering to be detected by detector 210 (FIG. 7). For example, in the case of Brillouin scattering, such as in Brillouin OTDR systems, probe laser 204 can provide pulses and detector can detect pulses or can scan the frequency of the received pulses. In Rayleigh scattering, such as in Rayleigh OTDR and OFDR systems, for coherent detection, the linewidth of probe laser 204 should be in the kilohertz range or less, whereas for non-coherent detection, the linewidth of probe laser 204 should be in the megahertz range or less. Probe laser 204 in these cases can be a pulsed laser or a CW laser with a modulator (as shown in FIG. 7) being enabled to gate probe laser 204.

According to some embodiments, second order Raman amplification can be used to shift the peak gain further along an optical fiber and to create a more evenly distributed gain and provides an improvement over the state-of-the-art distributed gain in distributed or quasi-distributed optical fiber sensing systems. As such, some embodiments can be implemented in a broad range of systems. It is applicable in sensor systems where the detected signal is reflected light from a single sensor or in a quasi-distributed multiple sensor system, such as in an FBG array. It can be implemented on distributed scatterings of different origins such as Rayleigh scattering and Brillouin scattering. It may also be implemented in configurations in which back-scattered signals, reflected signals or forward-scattered signals are measured. Since some embodiments relate to in-line amplification in an optical fiber, it can be used in conjunction with the measurement of different properties of light such as amplitude, phase and frequency. Some embodiments are not limited to any method of correlation of measurement to location. As described above, the probe light can be pulsed, as in an OTDR system, frequency swept as in an OFDR system or coded by other known methods. Some embodiments do not depend on the detection method used and can work with coherent detection, incoherent detection as well as direct detection. Some embodiments can be configured to amplifying a probe pulse by pumping from either end of an optical fiber, whereas other embodiments can be configured to amplify a probe pulse by pumping from both ends of the optical fiber. In some embodiments, Raman scattering rates are controlled by the power of a Raman pump laser and a Raman seed laser. As also described above, since each Raman mode is controlled by a separate laser, according to some embodiments, it is possible to alter the wavelengths of one or both of the Raman pump laser and Raman seed laser in order to increase or decrease the Raman scattering between the first order and second order modes independently of the power in each of the modes.

It will be appreciated by persons skilled in the art that some embodiments are not limited to what has been particularly shown and described hereinabove. Rather the scope of the disclosed technique is defined only by the claims, which follow.

The invention claimed is:

1. A method of providing in-line Raman amplification in an optical fiber sensing system, comprising the procedures of:

generating a probe light having a probe wavelength;
transmitting said probe light into an optical fiber;
generating at least one Raman pump light at a respective pump wavelength and pump power, wherein said respective pump wavelength is shorter than said probe wavelength, such that a corresponding frequency difference between said respective pump wavelength and said probe wavelength is a multiple of a frequency shift for which a Raman scattering coefficient is at least 25% of a resonant Raman scattering coefficient;

generating at least one Raman seed light at a respective seed wavelength and seed power, said respective seed wavelength being between said respective pump wavelength and said probe wavelength;

transmitting said at least one Raman pump light into said optical fiber;

transmitting said at least one Raman seed light into said optical fiber; and propagating said at least one Raman pump light, said at least one Raman seed light and said probe light along said optical fiber to achieve distributed Raman amplification of signal light produced by said probe light as it propagates along said optical fiber.

2. The method according to claim 1, wherein said signal light is selected from the list consisting of:
reflected light;
amplified light;
back-scattered light;
forward-scattered light;
Raman scattered light;
Brillouin scattered light; and
Rayleigh scattered light.

3. The method according to claim 1, wherein said corresponding frequency difference between said respective pump wavelength and said probe wavelength is twice a frequency shift for which said Raman scattering coefficient is at least 25% of said resonant Raman scattering coefficient, and wherein said Raman scattering coefficient is a single order coefficient;
wherein a corresponding frequency difference between said respective seed wavelength and said probe wavelength is a frequency shift for which said Raman scattering coefficient is at least 25% compared to a resonant Raman scattering frequency shift; and
wherein a corresponding frequency difference between said respective seed wavelength and said respective pump wavelength is a frequency shift for which said Raman scattering coefficient is at least 25% compared to said resonant Raman scattering frequency shift.

4. The method according to claim 1, further comprising the procedure of co-propagating at least one of said at least one Raman pump light and said at least one Raman seed light with said probe light.

5. The method according to claim 1, further comprising the procedure of counter-propagating at least one of said at least one Raman pump light and said at least one Raman seed light with said probe light.

6. The method according to claim 1, further comprising the procedure of bi-directionally propagating at least one of said at least one Raman pump light and said at least one Raman seed light with said probe light.

7. The method according to claim 1, further comprising the procedure of modulating a characteristic of at least one of said at least one Raman seed light and said at least one Raman pump light in correlation with changes to a power of said probe light.

8. The method according to claim 7, wherein said characteristic is selected from the list consisting of:
power; and
wavelength.

9. The method according to claim 7, wherein said procedure of modulating is used to avoid high power in said probe light which can cause an occurrence of at least one non-linear phenomenon in at least one location of said optical fiber.

10. The method according to claim 1, further comprising the procedure of optimizing a characteristic of said at least one Raman seed light to obtain amplification of said signal light from a specific location along said optical fiber.

11. The method according to claim 10, wherein said characteristic is selected from the list consisting of:
power; and
wavelength.

12. The method according to claim 1, further comprising the procedures of:
detecting said signal light from said optical fiber; and
analyzing said detected signal light to obtain information regarding at least one of said optical fiber and an environment wherein said optical fiber is positioned.

13. The method according to claim 1, further comprising the procedure of propagating said at least one Raman pump light, said at least one Raman seed light and said probe light along said optical fiber via at least one fiber Bragg grating (FBG), coupled at each end of said optical fiber, each one of said at least one FBG having a high reflectivity at wavelengths with at least 25% Raman scattering efficiency of a resonant Raman scattering, on orders at which said at least one Raman seed light is not generated.

14. The method according to claim 1, further comprising the procedure of employing additional amplification to deliver gain at an end of said optical fiber to which said at least one Raman pump light and said at least one Raman seed light are transmitted from.

15. The method according to claim 14, wherein said additional amplification is Brillouin amplification.

16. The method according to claim 1, wherein said at least one Raman pump light has a power ranging from 50 milliwatts to 10 watts and a Raman shifted wavelength between 20 to 30 terahertz from said probe wavelength and wherein said at least one Raman seed light has a power of less than 10 milliwatts and a Raman shifted wavelength between 7 to 16 terahertz from said probe wavelength.

17. The method according to claim 1, wherein said probe light is selected from the list consisting of:
continuous wave light; and
pulsed light.

18. Fiber optic sensing system exploiting in-line high order Raman amplification, comprising:
a probe source, comprising a probe laser, for generating a probe light having a probe wavelength;
an optical fiber, into which said probe light is optically coupled;
a separator, for separating signal light originating in said optical fiber from light coupled into said optical fiber;
a detector, optically coupled with said separator, for detecting said signal light;
a processor, coupled with said detector, for analyzing said detected signal light;
at least one Raman seed laser, for generating a respective Raman seed light having a respective seed wavelength and seed power;
at least one Raman pump laser, for generating a respective Raman pump light having a respective pump wavelength and pump power; and
at least one coupler, for coupling said at least one Raman pump laser and at least one Raman seed laser to said optical fiber, wherein said respective seed wavelength is between said respective pump wavelength and said probe wavelength; and wherein said respective Raman pump light, said respective Raman seed light and said probe light propagate along said optical fiber to achieve distributed Raman amplification of said signal light produced by said probe light as it propagates along said optical fiber.

19. The fiber optic sensing system according to claim 18, wherein probe light is coupled into said optical fiber via said separator and said at least one coupler.

20. The fiber optic sensing system according to claim 18, said probe source further comprising a modulator, coupled with said probe laser, for modulating said probe light.

21. The fiber optic sensing system according to claim 18, further comprising at least one fiber Bragg grating (FBG), coupled to each end of said optical fiber, each said at least one FBG having a high reflectivity at wavelengths with at least 25% Raman scattering efficiency of a resonant Raman scattering, on the orders at which said respective Raman seed light is not generated.

22. The fiber optic sensing system according to claim 18, wherein said at least one Raman pump laser and said at least one Raman seed laser are coupled with both ends of said optical fiber.

23. The fiber optic sensing system according to claim 18, wherein said signal light separated by said separator is optically combined with said probe light to enable coherent detection.

24. The fiber optic sensing system according to claim 18, wherein said signal light is correlated with said probe light.

25. The fiber optic sensing system according to claim 18, wherein said separator is selected from the list consisting of:
 a circulator;
 a coupler; and
 a wavelength division multiplexer (WDM) filter.

26. The fiber optic sensing system according to claim 18, wherein said signal light is selected from the list consisting of:
 reflected light;
 amplified light;
 back-scattered light;
 forward-scattered light;
 Raman scattered light;
 Brillouin scattered light; and
 Rayleigh scattered light.

27. The fiber optic sensing system according to claim 18, wherein said respective pump wavelength is such that a corresponding frequency difference between said respective pump wavelength and said probe wavelength is twice a frequency shift for which a Raman scattering coefficient is at least 25% of a resonant Raman scattering coefficient; and wherein said respective seed wavelength is such that a corresponding frequency difference between said respective seed wavelength and said probe wavelength and a corresponding frequency difference between said respective pump wavelength and said respective seed wavelength are both a frequency shift for which said Raman scattering coefficient is at least 25% of said resonant Raman scattering coefficient.

28. The fiber optic sensing system according to claim 18, further comprising an additional distributed amplifier, coupled with said at least one coupler, for delivering gain at an end of said optical fiber.

29. The fiber optic sensing system according to claim 28, wherein said additional distributed amplifier is a Brillouin amplifier.

30. The fiber optic sensing system according to claim 18, wherein said respective Raman pump light has a power ranging from 50 milliwatts to 10 watts and a Raman shifted wavelength between 20 to 30 terahertz from said probe wavelength and wherein said respective Raman seed light has a power of less than 10 milliwatts and a Raman shifted wavelength between 7 to 16 terahertz from said probe wavelength.

31. The fiber optic sensing system according to claim 18, further comprising a pump laser, coupled with an end of said optical fiber opposite an end said probe source is coupled with said optical fiber, for generating a pump light have a pump wavelength,
 wherein said separator is further for coupling said pump light into said optical fiber;
 wherein said signal light is said probe light as amplified by said pump light; and
 wherein at least one of said probe source and said pump laser is pulsed to have spatial resolution.

32. The fiber optic sensing system according to claim 18, wherein said at least one coupler is a wavelength division multiplexer (WDM) filter.

33. The fiber optic sensing system according to claim 18, wherein said respective seed wavelength and seed power and said respective pump wavelength and pump power are selected such that a Raman gain of said probe light and said signal light originating in said optical fiber occur at a desired location along said optical fiber.

* * * * *